United States Patent
Liu et al.

(10) Patent No.: US 12,422,951 B1
(45) Date of Patent: Sep. 23, 2025

(54) MATERIALS AND STRUCTURES FOR SPACER ELEMENTS IN A HUMAN-COMPUTER INTERFACE SYSTEM

(71) Applicant: Sensel, Inc., Sunnyvale, CA (US)

(72) Inventors: Ping Liu, Sunnyvale, CA (US); Sophia Chau, Sunnyvale, CA (US); Ninad Sathe, Sunnyvale, CA (US); Darren Lochun, Sunnyvale, CA (US); Ilya Daniel Rosenburg, Sunnyvale, CA (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 18/735,086

(22) Filed: Jun. 5, 2024

Related U.S. Application Data

(63) Continuation of application No. 18/082,148, filed on Dec. 15, 2022, now Pat. No. 12,039,132, which is a continuation-in-part of application No. 17/586,524, filed on Jan. 27, 2022, now Pat. No. 11,681,393, which is a continuation of application No. 17/191,636, filed on Mar. 3, 2021, now Pat. No. 11,281,330.

(60) Provisional application No. 63/289,986, filed on Dec. 15, 2021, provisional application No. 63/063,168, filed on Aug. 7, 2020, provisional application No.
(Continued)

(51) Int. Cl.
| | |
|---|---|
| G06F 3/044 | (2006.01) |
| G06F 3/041 | (2006.01) |
| G06F 3/045 | (2006.01) |
| G06F 3/046 | (2006.01) |

(52) U.S. Cl.
CPC .... *G06F 3/041661* (2019.05); *G06F 3/04144* (2019.05); *G06F 3/041662* (2019.05); *G06F 3/0445* (2019.05); *G06F 3/045* (2013.01); *G06F 3/046* (2013.01); *G06F 2203/04104* (2013.01); *G06F 2203/04105* (2013.01)

(58) Field of Classification Search
CPC ........ G06F 3/041661; G06F 3/041662; G06F 3/045; G06F 3/046; G06F 3/0445; G06F 3/04144; G06F 2203/04105; G06F 2203/04104
See application file for complete search history.

(56) References Cited

U.S. PATENT DOCUMENTS

| | | | |
|---|---|---|---|
| 9,229,592 B2 * | 1/2016 | Bulea | G06F 3/04142 |
| 9,454,268 B2 * | 9/2016 | Badaye | G06F 3/0416 |

(Continued)

*Primary Examiner* — Bryan Earles

(57) ABSTRACT

One variation of a system for a touch sensor includes: a substrate; a baseplate; and spacer elements. The substrate defines support locations. The baseplate spans a bottom layer of the substrate and defines spring elements: aligned to the support locations of the substrate; and configured to yield to displacement of the substrate toward the baseplate responsive to forces applied over the substrate. The spacer elements: are interposed between the support locations and the spring elements; and are configured to compress responsive to forces applied over the substrate. Each spacer element, in the spacer elements, includes: an elastomer element; a first adhesive layer; and a second adhesive layer. The first adhesive layer: is arranged over the elastomer element; and coupled to the bottom substrate layer at a support location. The second adhesive layer: is arranged below the elastomer element; and coupled to the baseplate at a spring element.

20 Claims, 11 Drawing Sheets

Related U.S. Application Data

63/040,433, filed on Jun. 17, 2020, provisional application No. 62/984,448, filed on Mar. 3, 2020.

(56) References Cited

U.S. PATENT DOCUMENTS

| | | | |
|---|---|---|---|
| 9,459,736 B2 * | 10/2016 | Badaye | G06F 3/04164 |
| 9,983,757 B2 * | 5/2018 | Porter | G06F 3/046 |
| 10,635,248 B2 * | 4/2020 | Hinson | G01L 1/142 |
| 2008/0202251 A1 * | 8/2008 | Serban | H03K 17/962 |
| | | | 29/25.03 |
| 2010/0231530 A1 * | 9/2010 | Lin | G06F 3/045 |
| | | | 345/173 |
| 2011/0025631 A1 * | 2/2011 | Han | G06F 3/0445 |
| | | | 345/173 |
| 2016/0209441 A1 * | 7/2016 | Mazzeo | G06F 3/0447 |

* cited by examiner

ELASTOMER MATERIAL COMPOSITION FOR HAPTICS

| GEL Y HAPTIC SCREEN | GEL THK (MM) | PSA | PSA THK UM | Y HAPTIC UNIT | Y HAPTIC PEAK FREQ HZ | Y HAPTIC @ 300HZ |
|---|---|---|---|---|---|---|
| PORON 4701-30 | 0.79 | 3M9607MP+3M468MP | 50 + 125 | MAH 1077 | 330 | -7.5 |
| PORON 4701-50 | 0.79 | 3M9607MP+3M468MP | 50 + 125 | MAH 1077 | 660 | -2 |
| PORON 4790-92 | 0.79 | 3M9607MP+3M468MP | 50 + 125 | MAH 1077 | 550 | -4.5 |

| NAME | DENSITY | TENSILE STRENGTH KPA | ELONGATION | COMPRESSION SET | COMPRESS FORCE DEFLECTION | SAMPLE FROM VENDOR |
|---|---|---|---|---|---|---|
| PORON 4701-30 (PU FOAM) | 0.4 | 484 | 150% | 2% | 62 KPA | STOCKWELL, RECEIVED, 1 SIDE W 9667MP PSA 50UM, OTHER SIDE 3M468MP |
| PORON 4701-50 (PU FOAM) | 0.48 | 1382 | 90% | 5% | 269 KPA | STOCKWELL, RECEIVED, 1 SIDE W 9667MP PSA 50UM, OTHER SIDE 3M468MP |
| PORON 4790-92 (PU FOAM) | 0.192 | 103 | 129% | 2% | 15 KPA | STOCKWELL, RECEIVED, 1 SIDE W 9667MP PSA 50UM, OTHER SIDE 3M468MP |

*FIGURE 7*

MATERIALS AND STRUCTURES FOR SPACER ELEMENTS IN A HUMAN-COMPUTER INTERFACE SYSTEM

CROSS-REFERENCE TO RELATED APPLICATIONS

This Application is a continuation of U.S. Non-Provisional application Ser. No. 18/082,148, filed on 15 Dec. 2022, which is a continuation-in-part of U.S. Non-Provisional application Ser. No. 17/586,524, filed on 27 Jan. 2022, which is a continuation of U.S. Non-Provisional patent application Ser. No. 17/191,636, filed on 3 Mar. 2021, which claims the benefit of U.S. Provisional Patent Application Nos. 62/984,448, filed on 3-MAR-2020, 63/040,433, filed on 17 Jun. 2020, and 63/063,168, filed on 7 Aug. 2020, each of which is incorporated in its entirety by this reference.

This application claims the benefit of U.S. Provisional Application No. 63/289,986, filed on 15 Dec. 2021, which is incorporated in its entirety by this reference.

This Application is related to U.S. Non-Provisional application Ser. Nos. 17/855,747, filed on 30 Jun. 2022, and Ser. No. 17/946,931, filed on 16 Sep. 2022, each of which is incorporated in its entirety by this reference.

TECHNICAL FIELD

This invention relates generally to the field of touch sensors and more specifically to a new and useful human-computer interface system in the field of touch sensors.

BRIEF DESCRIPTION OF THE FIGURES

FIG. 7 is a schematic representation of the system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
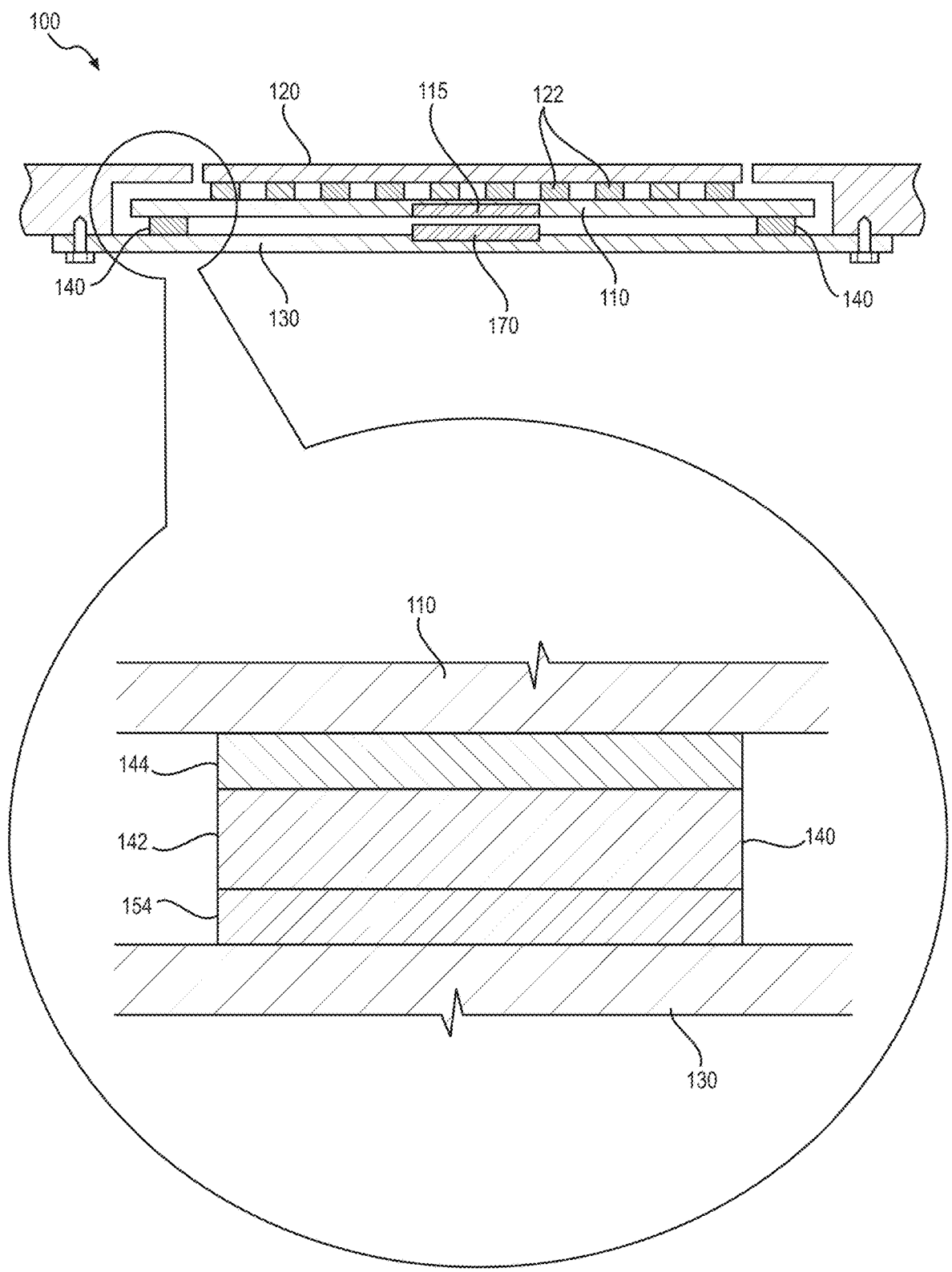
FIG. 1 is a schematic representation of a system.

As shown in FIG. 1, a system 100 for a touch sensor includes: a substrate 110; a touch sensor surface 120; a baseplate 130; and a set of spacer elements 140. The substrate 110 includes: a top substrate layer 112; and a bottom substrate layer 114 defining a set of support locations.

The touch sensor surface 120 is arranged over the top substrate layer 112 of the substrate 110. The baseplate 130: spans the bottom substrate layer 114 of the substrate 110; and defines a set of spring elements 132. The set of spring elements 132 are: aligned to the set of support locations of the bottom substrate layer 114; and configured to yield to displacement of the substrate 110 toward the baseplate 130 responsive to forces applied to the touch sensor surface 120.

Additionally, the set of spacer elements 140: are interposed between the set of support locations of the substrate 110 and the set of spring elements 132 of the baseplate 130; couple the substrate 110 to the baseplate 130; and are configured to compress responsive to forces applied to the touch sensor surface 120. Furthermore, each spacer element, in the set of spacer elements 140 includes: an elastomer element 142; a first adhesive layer 144; and a second adhesive layer 154. The first adhesive layer 144 is: arranged over the elastomer element 142; and coupled to the bottom substrate layer 114 at a support location, in the set of support locations. The second adhesive layer 154 is: arranged below the elastomer element 142; and coupled to the baseplate 130 at a spring element, in the set of spring elements 132.

2. Applications

Generally, the system 100 for human-computer interfacing includes: a touch sensor; a multi-layer inductor 115; and a controller 190. The touch sensor includes: a substrate 110; an array of drive and sense electrode pairs 122 patterned across the substrate 110; a cover layer defining a touch sensor surface 120; and a force-sensitive layer arranged between the substrate 110 and the cover layer and including a material exhibiting changes in local contact resistance (and/or changes in local bulk resistance) responsive to changes in force magnitude applied to the touch sensor surface 120. The substrate 110 can be flexibly mounted within a receptacle (e.g., a touchpad receptacle) of a chassis of a computing device to permit movement (i.e., oscillation, vibration) of the substrate 110 within the chassis during a haptic feedback cycle.

A set of magnetic elements 170 are arranged within (e.g., rigidly coupled to, bonded to) a receptacle (e.g., a touchpad receptacle). A set of spiral traces are fabricated within each of multiple adjacent layers of the substrate 110-below the drive and sense electrode pairs 122—and are connected by vias to form a multi-layer inductor 115 arranged over the magnetic elements 170.

A set of spacer elements 140 are arranged below the substrate 110 and couple the substrate 110 to the chassis. The set of spacer elements 140 are configured to transfer vibration of the set of magnetic elements 170 to the cover layer and dampen vibrations to the chassis. The set of spacer elements 140 can include an elastomer element 142 and an adhesive element arranged over a top surface and a bottom surface of the elastomer element 142.

During a scan cycle, the controller 190: reads electrical values from the drive and sense electrode pairs 122 during a scan cycle; and interprets locations and force magnitudes of inputs on the touch sensor surface 120 based on these electrical values. In response to detecting a new input—that exceeds a threshold force magnitude—on the touch sensor surface 120, the controller 190: outputs a command based on a location and/or force magnitude of the input; and selectively drives the multi-layer inductor 115 with an oscillating voltage (or oscillating current), which induces an alternating magnetic field through the multi-layer inductor 115, magnetically couples the multi-layer inductor 115 to the magnetic elements 170, yields an alternating force between the multi-layer inductor 115 and the magnetic elements 170, and thus oscillates the substrate 110 at a target frequency range (e.g., between 250-350 Hz) and the touch sensor surface 120 relative to the chassis of the device.

2.1 Integrated Induction Coil

In this variation the multi-layer inductor 115 and the set of magnetic elements 170 can cooperate to form an integrated vibrator configured to oscillate the substrate 110 within the chassis.

For example, the multiple-layer inductor can include: a first trace spiraling inwardly in a first wind direction on a bottom substrate layer 114 of the substrate 110; a second trace spiraling outwardly spiraling outwardly in the first wind direction on a second layer of the substrate 110; a third trace spiraling inwardly in the first wind direction on a third layer of the substrate 110; and a fourth trace spiraling outwardly in the first wind direction—between adjacent loops of the second trace—on the second layer of the substrate 110. Vias can connect: the end of the first spiral trace 117 in the first layer to the start of the second spiral trace 119 in the second layer; the end of the second spiral trace 119 in the second layer to the start of the third spiral trace in the third layer; the end of the third spiral trace in the third layer to the start of the fourth spiral trace in the second layer; and the end of the fourth spiral trace in the second layer to the bottom layer near the start of the first spiral trace 117. In this example, the multi-layer inductor 115 can include multiple spiral traces spanning multiple layers of the substrate 110 and connected to form a continuous inductive coil with two terminals falling in close proximity (e.g., within two mm) on the bottom substrate layer 114 of the substrate 110.

The set of magnetic elements 170 can be bonded, fastened, mounted, and/or integrated in a chassis of a device beneath the multilayer inductor and can magnetically couple the multi-layer inductor 115 when a voltage is applied across the multi-layer inductor 115 by the controller 190. In particular, the controller 190 can supply an oscillating voltage (and therefore an alternating current) to the multi-layer inductor 115 which induces: an alternating magnetic field through the multi-layer inductor 115; alternating magnetic coupling between the set of magnetic elements 170 and the multilayer inductor; and thus oscillates the substrate 110.

2.2 Unitary Substrate with Integral Input and Output Components

Generally, in this variation, the system 100 functions as a touch sensor with an integrated haptic actuator, pressure sensing, and shielding within a thin (e.g., 4-mm thick) package. For example, the system 100 can be installed in a touch bad receptacle in a laptop computer, in a touch pad receptacle in a peripheral user input device, or under a display of a tablet of smartphone.

The system 100 can include a thin (e.g., 2.5 mm thick) substrate 110 that defines a suite of thin traces that form: drive and sense electrodes of a touch sensor; drive and sense electrodes of a set of secondary force or pressure sensors; and an inductor configured to magnetically couple to an adjacent magnetic element 170. In particular, the multilayer inductor: is integrated into a substrate 110 in the form of multiple interconnected spiral traces etched or otherwise fabricated across multiple layers of the substrate 110; and is configured to magnetically couple to a magnetic element 170 integrated into (e.g., located and retained by) a chassis. Thus, the set of magnetic elements 170 and the multi-layer inductor 115 cooperate to function as a multilayer inductor configured to oscillate a touch sensor surface 120 responsive to polarization of the multilayer inductor, thereby enabling the system 100 to output real-time haptic feedback in response to inputs on the touch sensor surface 120.

Therefore, the system 100 can include a set of planar interconnected spiral traces fabricated across multiple conductive layers of the substrate 110 to form a multi-layer inductor 115 located fully within the substrate 110 and fabricated concurrently with and with the same processes as touch sensor electrode traces that form a capacitive or resistive touch sensor across a top of the substrate 110 and that form a capacitive or resistive pressure sensor across a bottom of the substrate 110.

More specifically, a dense grid array of drive and sense electrode pairs 122 can be concurrently fabricated across a top substrate layer 112 of the substrate 110 to form a touch sensor configured to detect the x-position, the y-position, and/or a force magnitude of an input on the touch sensor surface 120. Additionally, or alternatively, a set of sensor traces can be concurrently fabricated on a bottom substrate layer 114 of the substrate 110 at intermittent locations about a perimeter of the substrate 110 to form a sparse array of force sensors configured to detect a force magnitude of an input on the touch sensor surface 120. The electrical traces that form these sensors can therefore fall fully within the substrate 110. A thin cover layer (e.g., a 0.5-millimeter-thick glass or polymer panel for a capacitive touch sensor; a 0.5-millimeter-thick force sensing layer for the resistive touch sensor arranged across the top substrate layer 112 of the substrate 110) can be installed over the top substrate layer 112 of the substrate 110 to enclose the touch sensor and form a touch sensor surface 120. Force-sensing coupons and/or low-durometer spacers can be installed over each sensor trace on the bottom of the substrate 110 to form a set of spacer elements 140 configured to support the substrate 110 with the receptacle of the substrate 110 to carry forces input on the touch sensor surface 120 into the chassis, and to output signals corresponding to forces carried by the individual sensor traces, which the controller 190 can convert into individual forces and total forces carried at these spacer elements in response to inputs on the touch sensor surface 120. A thin, non-conductive, non-magnetic buffer layer (e.g., a polyimide film less than 0.2 millimeters in thickness) can be applied over the bottom spiral trace of the multi-layer inductor 115 and the set of magnetic elements 170 arranged in the receptacle below. Thus, the total height of the system 100 with the cover layer and the set of spacer elements 140 may be less than 4 millimeters.

Furthermore, the chassis of a device (e.g., a laptop computer, a peripheral input device) can define a shallow (e.g., 4-millimeter deep) receptacle, and the system 100 can be installed in the receptacle—with the spacer elements in contact with the base of the receptacle—to enable touch sensing, pressure sensing, and the haptic feedback functionality in the device with no or limited increase in thickness of the chassis. In one implementation, the chassis of the device further includes a cavity recessed below the receptacle and the set of magnetic elements 170 is installed (e.g., bonded, potted) within the cavity below the multi-layer inductor 115 on the substrate 110. Alternatively, a thinner magnetic element 170 (e.g., 0.8 mm in thickness) can be installed in the receptacle between the base of the cavity and the bottom of the substrate 110 (e.g., between the base of the cavity and the buffer layer arranged over the first spiral trace 117 of the multi-layer inductor 115.

Therefore, the system 100—including the substrate 110, the touch sensor, and/or the spacer elements—can sit low in the receptacle of the device with a small gap between the bottom substrate layer 114 of the substrate 110 and the receptacle. (e.g., less than 300 microns rather than multiple millimeters to accommodate a discrete inductor installed on the substrate 110), thereby limiting total assembled height of the system 100 and the device. Furthermore, integration of the multi-layer inductor 115 into the substrate 110 may reduce and/or eliminate possibility of fatigue or other damage to the multi-layer inductor 115 and the set of magnetic elements 170, thereby enabling looser tolerances for vertical separation distance between the substrate 110 and the receptacle.

3. Substrate and Touch Sensor

In one implementation, the system 100 can include: a substrate 110 that includes a set of conductive layers etched to form a set of conductive traces; a set of substrate layers interposed between the stack of conductive layers; and a set of vias that connect the set of conductive traces through the set of substrate layers.

In particular, a top conductive layer and/or a second conductive layer of the substrate 110 can include a set of traces that cooperate to form an array (e.g., a grid array) of drive and sense electrode pairs 122 within a touch sensor. Subsequent conductive layers of the substrate 110 below the touch sensor can include interconnected spiral traces that cooperate to form a single- or multi-core, single- or multi-winding, multi-layer inductor 115. Furthermore, a bottom conductive layer and/or penultimate conductive layer of the substrate 110 can include a set of interdigitated electrodes distributed about the perimeter of the substrate 110 to form a sparse array of force sensors.

3.1 Resistive Touch Sensor

In one implementation, the first and second conductive layers of the substrate 110 include columns of drive electrode and rows of sense electrodes (or vice versa) that terminate in a gride array of drive and sense electrode pairs 122 on the top substrate layer 112 of the substrate 110. In this implementation, the system 100 further includes a force sensitive layer: arranged over the top conductive layer of the substrate 110 (interposed between the top substrate layer 112 of the substrate 110 and the cover layer); and exhibiting local changes in contact resistance across the set of drive and sense electrode pairs 122 responsive to local application of forces on the cover layer (i.e., on the touch sensor surface 120).

Accordingly, during a scan cycle, the controller 190 can: serially drive the columns of drives electrodes; serially read electrical values—(e.g., voltages) representing electrical resistances across drive and sense electrode pairs 122—from the rows of sense electrodes; detect a first input at a first location (e.g., an (x, y) location) on the touch sensor surface 120 based on deviation of electrical values—read from a subset of drive and sense electrode pairs 122 adjacent the first location—from baseline resistance-based electrical values stored for this subset of drive and sense electrode pairs 122; and interpret a force magnitude of the first input based on a magnitude of this deviation. As described below, the controller 190 can then drive an oscillating voltage across the multi-layer inductor 115 in the substrate 110 during a haptic feedback cycle in response to the force magnitude of the first input exceeding a threshold input force.

The array of drive and sense electrode pairs 122 on the first and second conductive layers of the substrate 110 and the force-sensitive layer can thus cooperate to form a resistive touch sensor readable by the controller 190 to detect lateral positions, longitudinal positions, and force (or pressure) magnitudes of inputs (e.g., fingers, styluses, palms) on the touch sensor surface 120.

3.2 Capacitive Touch Sensor

In another implementation, the first and second conductive layers of the substrate 110 102 include columns of drive electrodes and rows of sense electrodes (or vice versa) that terminate in a grid array of drive and sense electrode pairs 122 on the top conductive layer (or on both the top and second conductive layers) of the substrate 110.

During a scan cycle, the controller 190 can: serially drive the columns of drive electrodes; serially read electrical values (e.g., voltage, capacitance rise time, capacitance fall time, resonant frequency)—representing capacitive coupling between drive and sense electrode pairs 122—from the rows of sense electrodes; and detect a first input at a first location (e.g., an (x, y) location) on the touch sensor surface 120 based on deviation of electrical values—read from a subset of drive and sense electrode pairs 122 adjacent the first location—from baseline capacitance-based electrical values stored for this subset of drive and sense electrode pairs 122. For example, the controller 190 can implement mutual capacitance techniques to read capacitance values between these drive and sense electrode pairs 122 and to interpret inputs on the touch sensor surface 120 based on these capacitance values.

The array of drive and sense electrode pairs 122 on the first and second conductive layers of the substrate 110 and the force-sensitive layer can thus cooperate to form a capacitive touch sensor readable by the controller 190 to detect lateral and longitudinal positions of inputs (e.g., fingers, styluses, palms) on the touch sensor surface 120.

4. Multi-Layer Inductor

As described in U.S. patent application Ser. No. 17/855,747, which is incorporated in its entirety by reference in this Application: the system 100 includes a multi-layer inductor 115 formed by a set of interconnected spiral traces fabricated directly within conductive layers within the substrate 110.

Generally, the total inductance of a single spiral trace may be limited by the thickness of the conductive layer. Therefore, the system 100 can include a stack of overlapping, interconnected spiral traces fabricated on a set of adjacent layers of the substrate 110 to form a multi-layer, multi-turn, and/or multi-core inductor that exhibits greater inductance—and therefore greater magnetic coupling to the set of magnetic elements 170—than a single spiral trace on a single conductive layer of the substrate 110. These spiral traces can be coaxially aligned about a common vertical axis (e.g., centered over the set of magnetic elements 170) and electrically interconnected by a set of vias through the intervening substrate layers of the substrate 110.

Furthermore, the substrate 110 can include conductive layers of different thicknesses. Accordingly, spiral traces within thicker conductive layers of the substrate 110 can be fabricated with narrower trace widths and more turns, and spiral traces within thinner conductive layers of the substrate 110 can be fabricated with wider trace widths and fewer turns in order to achieve similar electrical resistances within each spiral trace over the same coil footprint. For example, lower conductive layers within the substrate 110 can include heavier layers of conductive material (e.g., one-ounce copper approximately 35 microns in thickness) in order to accommodate narrower trace widths and more turns within the coil footprint in these conductive layers, thereby increasing inductance of each spiral trace and yielding greater magnetic coupling between the multi-layer inductor 115 and the set of magnetic elements 170 during a haptic feedback cycle. Conversely, in this example, the upper layers of the substrate 110—which include many (e.g., thousands of) drive and sense electrode pairs 122 of the touch sensor—can include thinner layers of conductive material.

5. Magnetic Element

As described in U.S. patent application Ser. No. 17/855,747, which is incorporated in its entirety by reference in this Application: Generally, the system 100 includes a set of magnetic elements 170: rigidly coupled to the chassis beneath the multi-layer inductor 115; and configured to magnetically couple to the multi-layer inductor 115 during a haptic feedback cycle, thereby applying an oscillating force to the multi-layer inductor 115 and oscillating the substrate 110—and therefore the touch sensor surface 120-within the receptacle during this haptic feedback cycle.

In particular, the spiral traces within the multi-layer inductor 115 can span a coil footprint, such as a rectangular or ellipsoidal footprint including: long sides parallel to a primary axis of the multi-layer inductor 115; and short sides parallel to a secondary axis of the multi-layer inductor 115. For example: the substrate 110 can be 5 inches in width and 3 inches in length; the touch sensor surface 120 can span an area approximately 5 inches by 3 inches over the substrate 110; and the coil footprint of each single-core multi-layer inductor 115 within the substrate 110 can be approximately 1.5 inches in length and 0.5 inches in width with the primary axis of the single-core multi-layer inductor 115 extending laterally across the width of the substrate 110.

In one implementation, the set of magnetic elements 170 are arranged relative to the multi-layer inductor 115 in order to induce an oscillating force-between the multi-layer inductor 115 and the magnetic elements 170-parallel to the touch sensor surface 120 such that the substrate 110 oscillates horizontally in a plane parallel to the touch sensor surface 120 during a haptic feedback cycle.

In another implementation, the set of magnetic elements 170 are arranged relative to the multi-layer inductor 115 in order to induce an oscillating force-between the multi-layer inductor 115 and the magnetic elements 170-normal to the touch sensor surface 120 such that the substrate 110 oscillates vertically within the chassis during a haptic feedback cycle.

6. Chassis Integration

As described above, the substrate 110 is flexibly mounted to the chassis (e.g., within or over a receptacle defined by the chassis) to enable the substrate 110 to oscillate horizontally or vertically relative to the chassis during a haptic feedback cycle.

6.1 Spacer Elements

In one configuration described in U.S. patent application Ser. No. 17/191,631, which is incorporated in its entirety by this reference: the top substrate layer 112 of the substrate 110 includes an array of drive and sense electrode pairs 122 arranged in a grid array, at a first density, and in a mutual capacitance configuration; and a bottom substrate layer 114 of the substrate 110 includes a second set of drive and sense electrode pairs (e.g., a sparse perimeter array of interdigitated drive and sense electrode pairs 122) located proximal a perimeter of the substrate 110 at a second density less than the first density. In this implementation, the system 100 further includes a set of spacer elements 140 (e.g., short elastic columns or buttons, adhesive films) coupled to the bottom substrate layer 114 of the substrate 110 over each sensor trace and configured to support the substrate 110 on the chassis of the device. In particular, each spacer element can include a force-sensitive layer: arranged across a sensor trace in the second set of drive and sense electrode pairs; and exhibiting changes in contact resistance across the sensor trace responsive to a load on the touch sensor surface 120 that compresses the deflection space against the substrate 110.

Accordingly, in this implementation, the controller 190 can: read a first set of electrical values—representing capacitive coupling between drive and sense electrode pairs 122—from the set of drive and sense electrode pairs 122; and detect a first input at a first location on the touch sensor surface 120 based on deviation of electrical values—read from a subset of drive and sense electrode pairs 122 adjacent the first location—from baseline capacitance values stored for this subset of drive and sense electrode pairs 122. During this same scan cycle, the controller 190 can also: read a second set of electrical values (e.g., electrical resistances)—representing compression of the set of spacer elements 140 against the second set of drive and sense electrode pairs—from the second set of drive and sense electrode pairs; interpret a force magnitude of the first input based on magnitudes of deviations of electrical (e.g., resistance) values from baseline electrical values across the set of sensor traces; and drive an oscillating voltage across the multi-layer inductor 115 during a haptic feedback cycle in response to the force magnitude of the first input exceeding a threshold input force.

Generally, in this configuration, the set of spacer elements 140: are interposed between the bottom substrate layer 114 of the substrate 110 and the base of the receptacle; and vertically support the substrate 110 within the receptacle.

In one implementation, each spacer element includes a coupon: bonded to the bottom face of the substrate 110 and to the base of the receptacle; and formed in a low-durometer or elastic material that deflects laterally (or "shears") to enable the substrate 110 to translate laterally within the receptacle responsive to alternating magnetic coupling between the multi-layer inductor 115 and the set of magnetic elements 170 during a haptic feedback cycle. In another implementation, each spacer element includes: a coupon bonded to the bottom face of the substrate 110; and a bottom face coated or including a low-friction material configured to slide across the base of the receptacle to enable the substrate 110 to translate laterally in the receptacle during a haptic feedback cycle while also vertically supporting the substrate 110 over the receptacle. In yet another implementation and as described below, each spacer element is mounted to a spring or flexure 134—which is mounted to the chassis—that enables the spacer element to move laterally within the receptacle while vertically supporting the substrate 110 within the receptacle.

Figure 2:
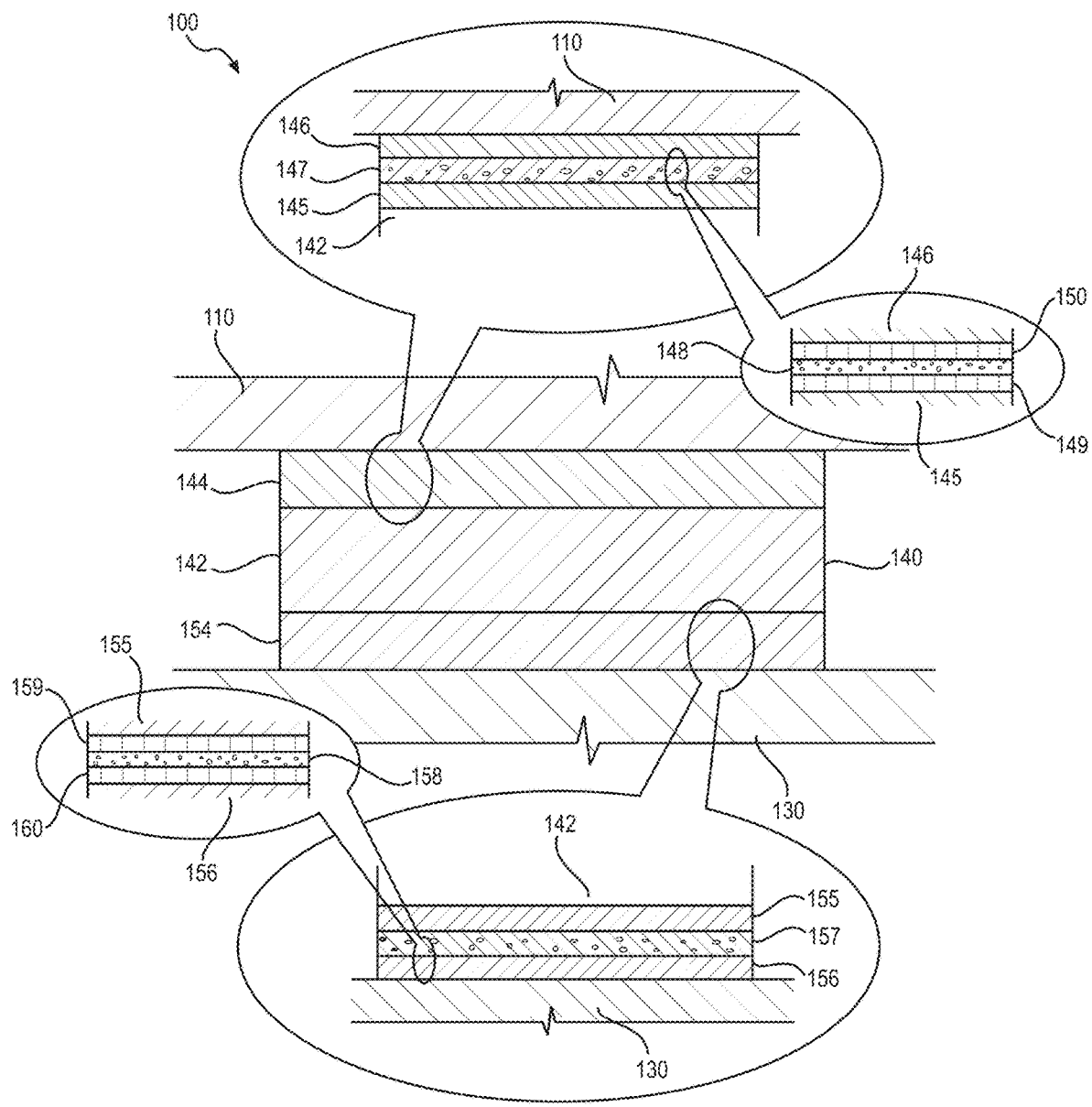
FIG. 2 is a schematic representation of the system.
Figure 3:
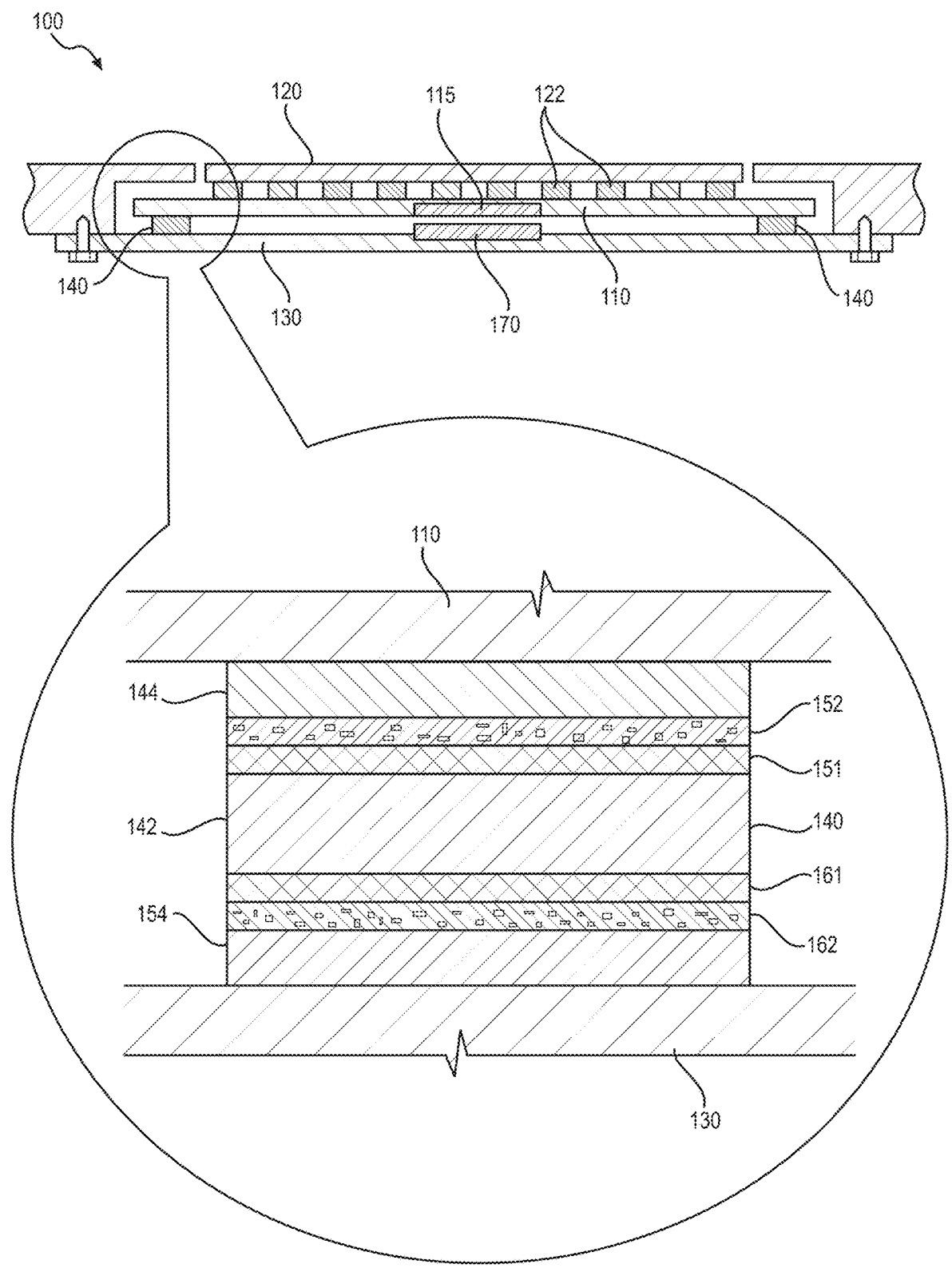
FIG. 3 is a schematic representation of the system.
Figure 4:
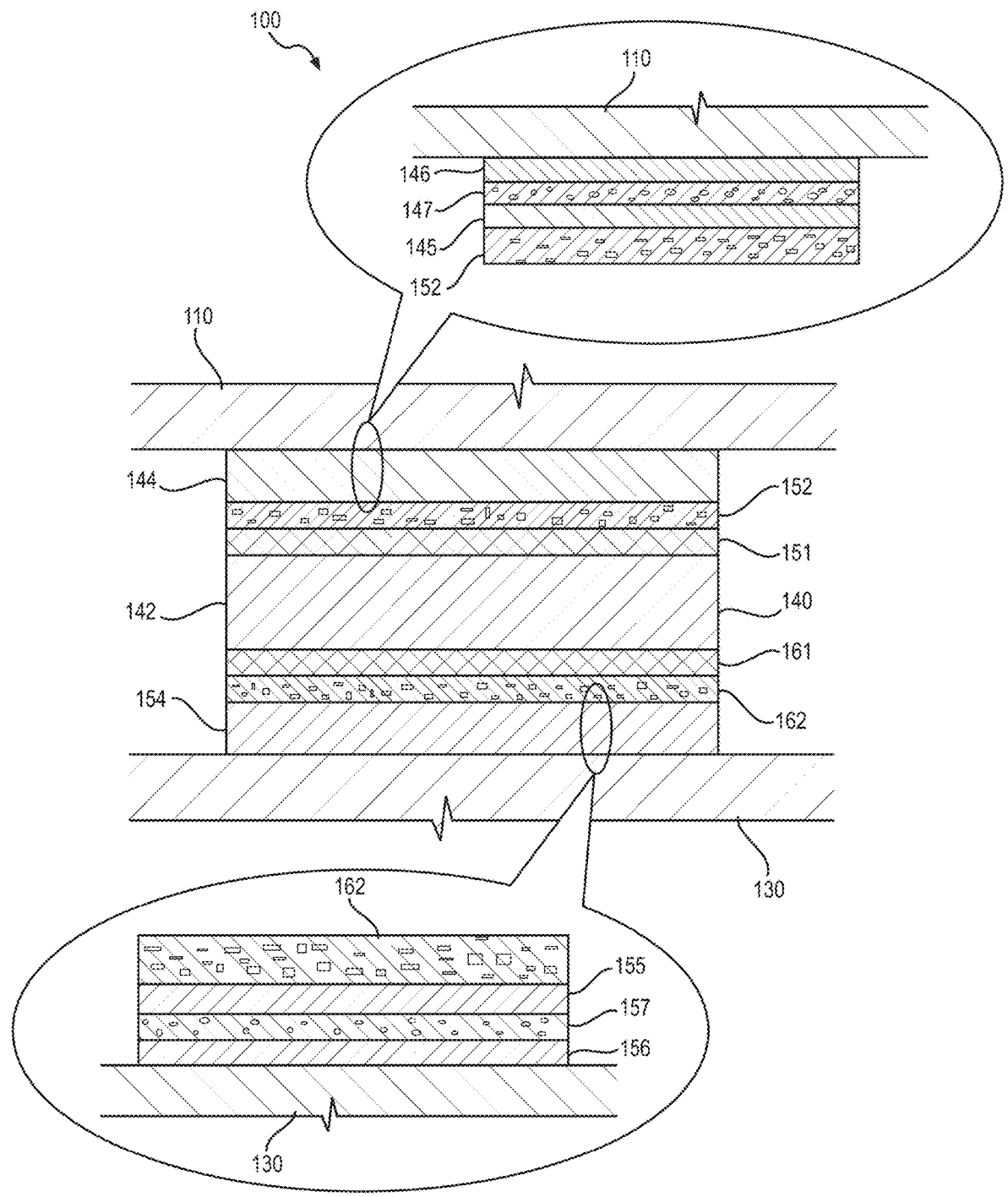
FIG. 4 is a schematic representation of the system.
Figure 5A:
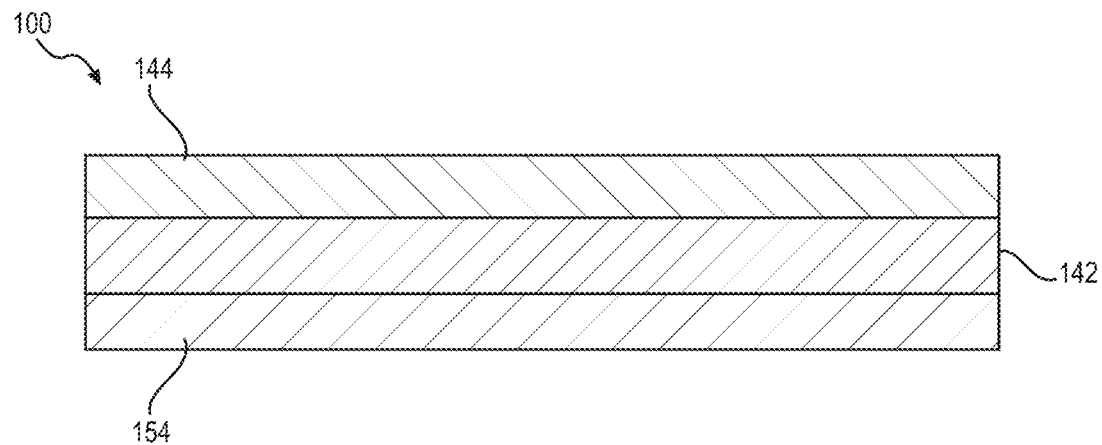
FIGS. 5A, 5B, and 5C are a schematic representation of the system.
Figure 5B:
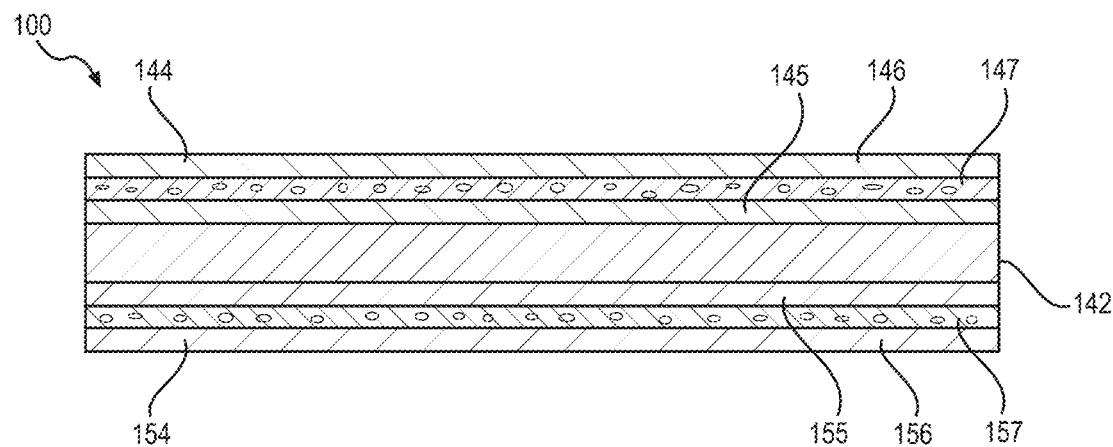
Figure 5C:
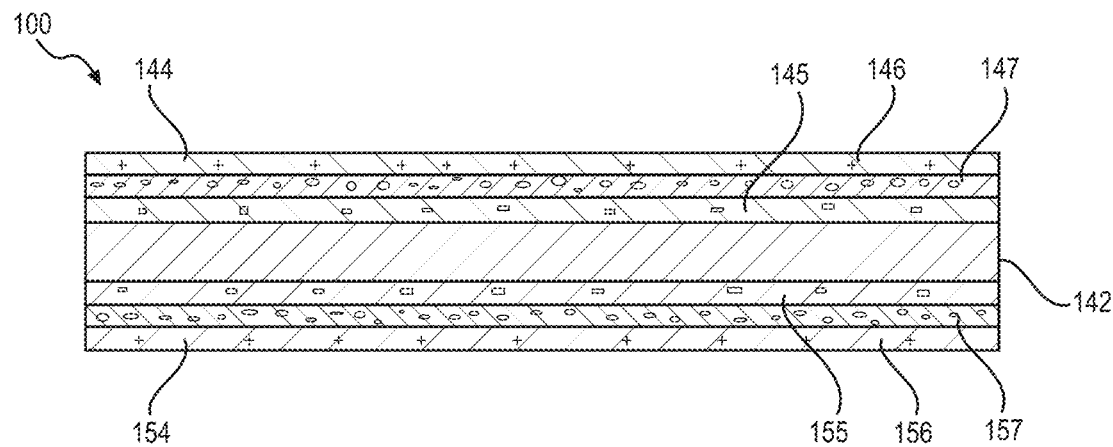
Figure 6A:
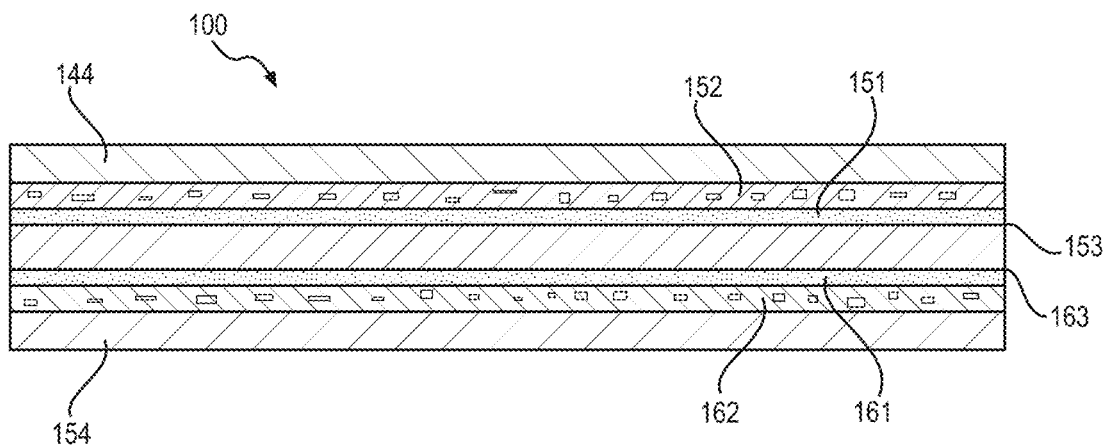
FIGS. 6A, 6B, and 6C are a schematic representation of the system.
Figure 6B:
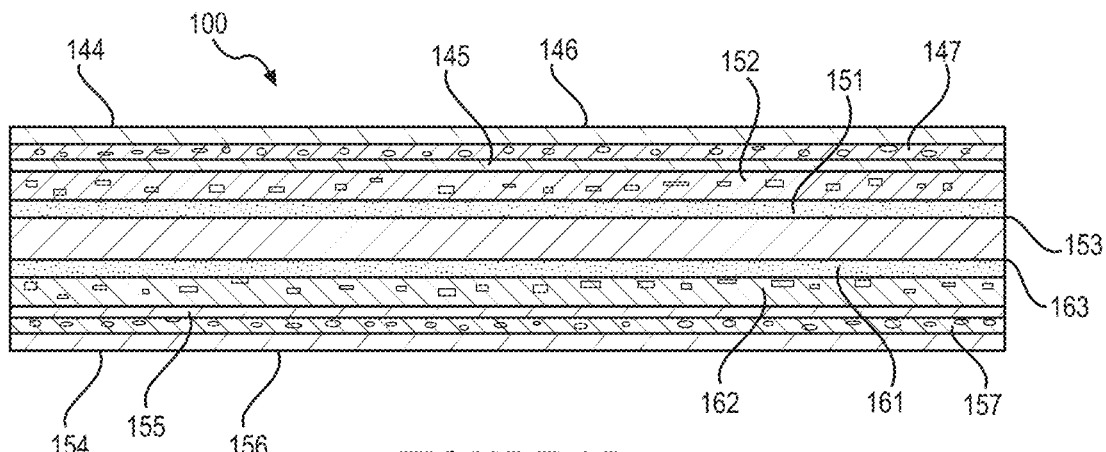
Figure 6C:
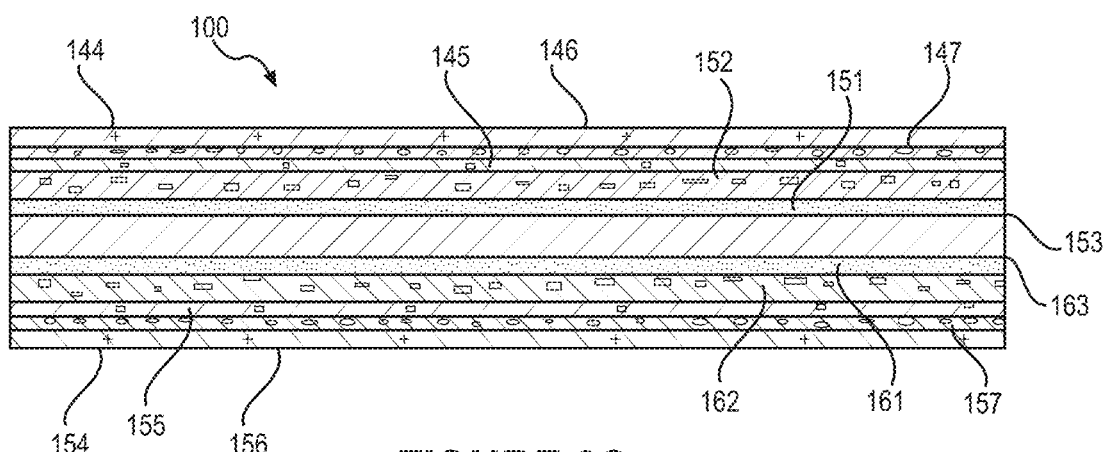
Figure 8:
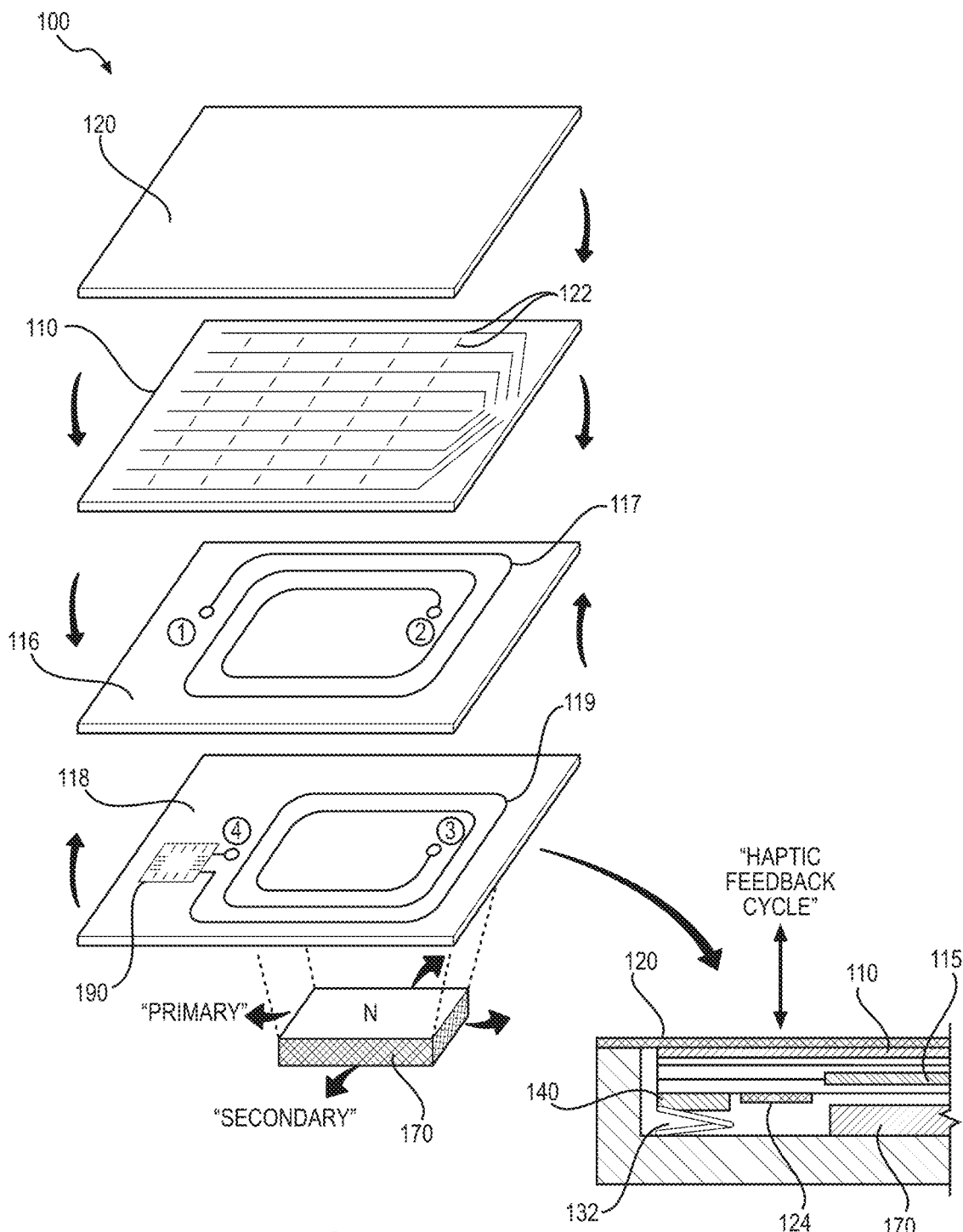
FIG. 8 is a schematic representation of the system.
Figure 9:
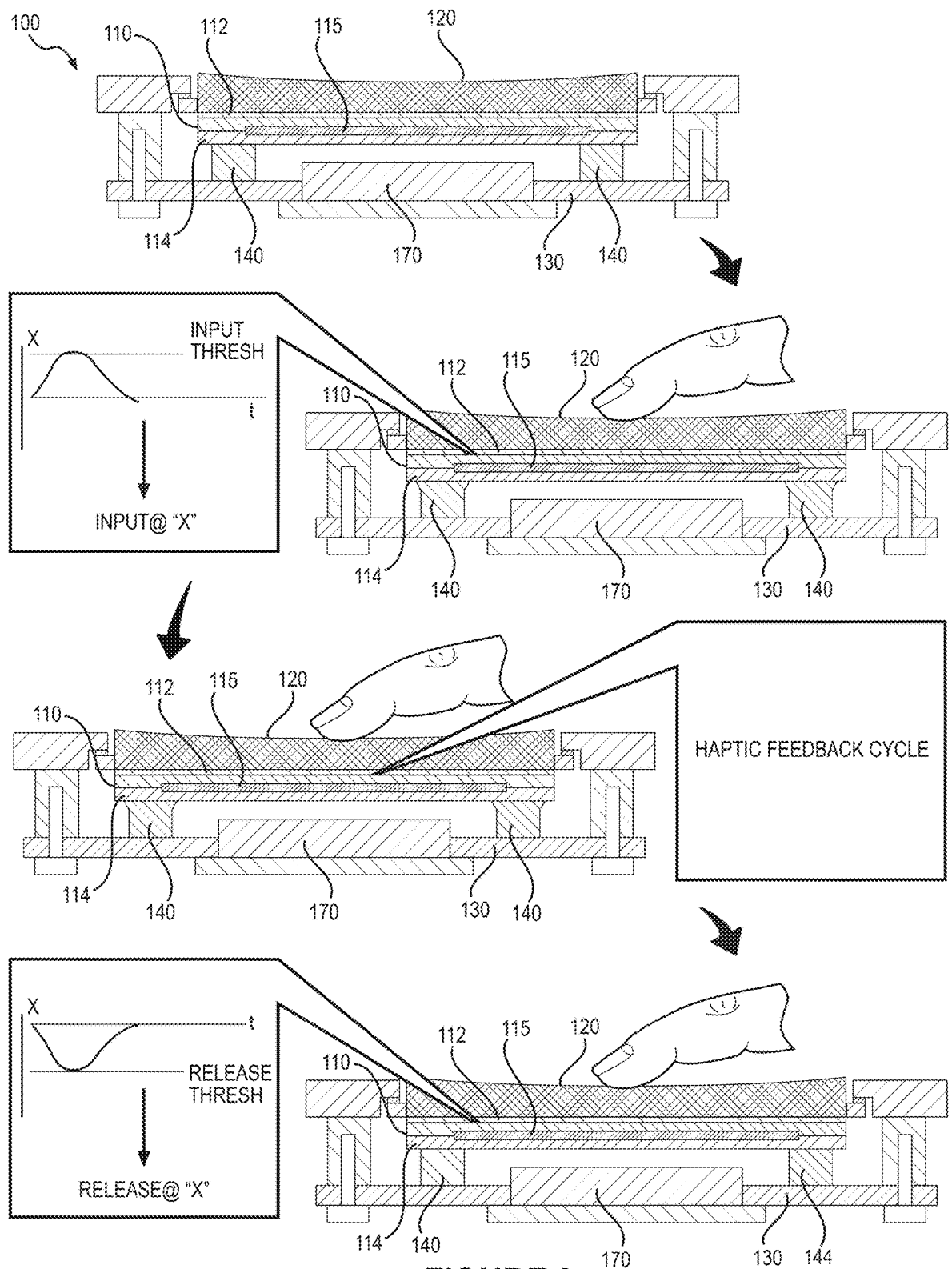
FIG. 9 is a schematic representation of the system.
Figure 10:
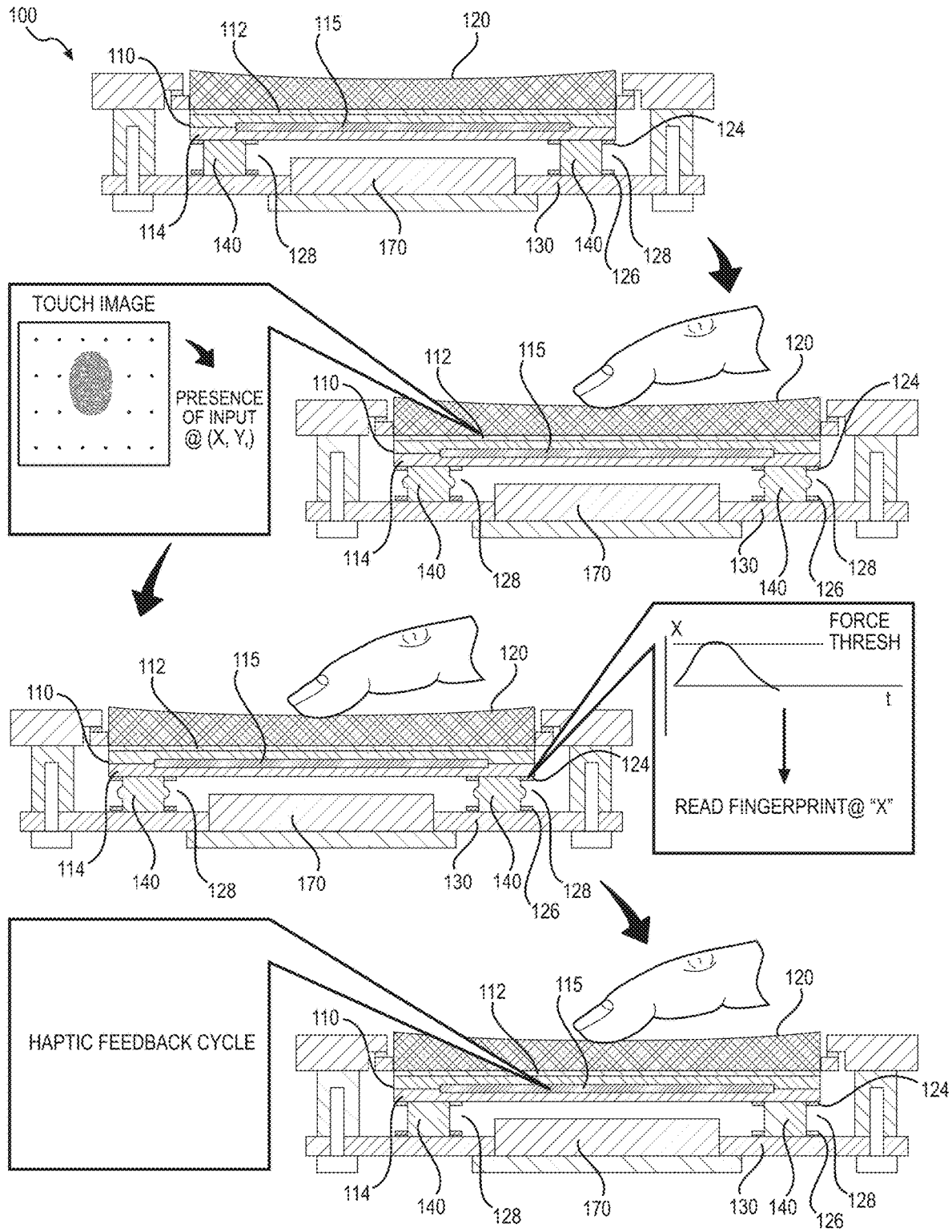
FIG. 10 is a schematic representation of the system.
Figure 11A:
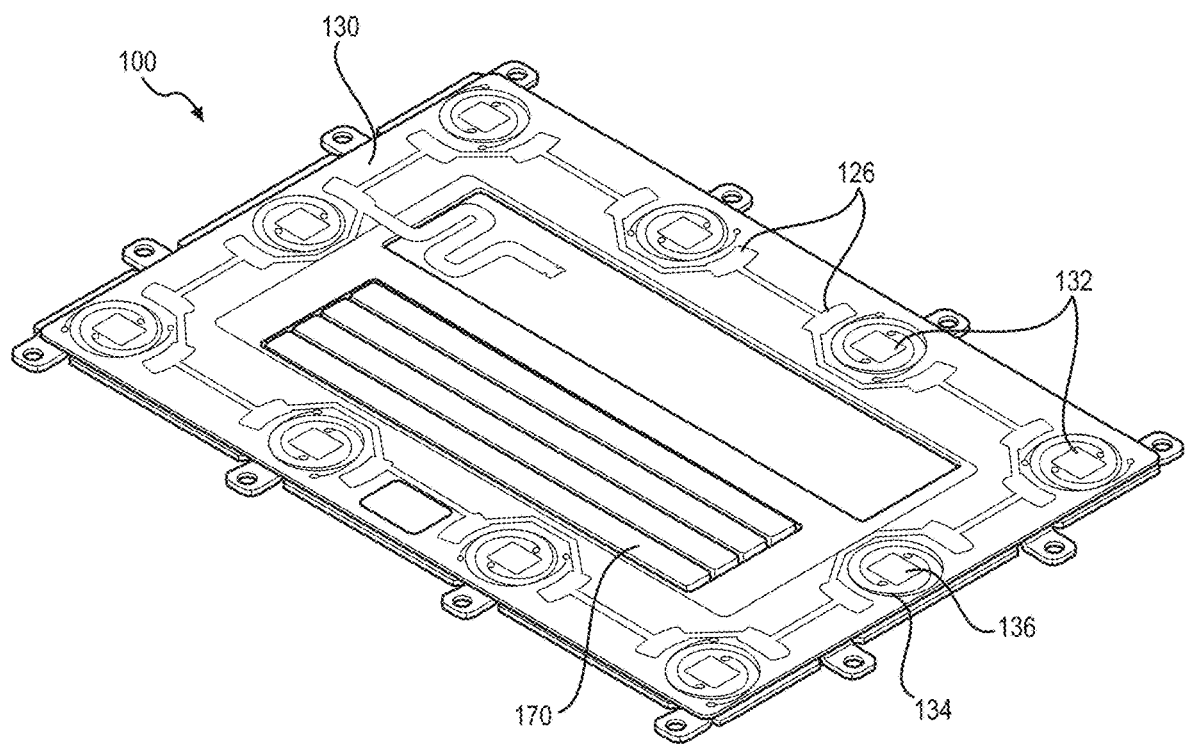
FIGS. 11A and 11B are a schematic representation of the system.
Figure 11B:
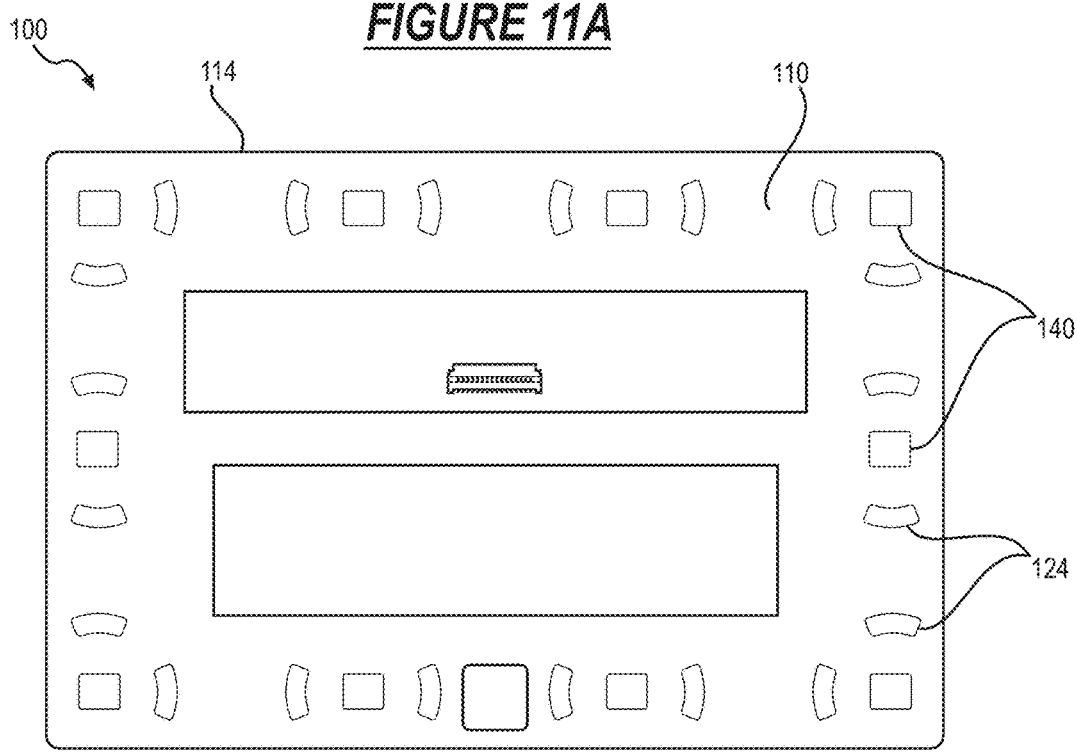

In this configuration, the bottom conductive layer of the substrate 110 can include a pair of interdigitated drive and sense electrodes in each spacer element location about the perimeter of the substrate 110, as shown in FIG. 2A. Furthermore, each spacer element can include a layer of force-sensitive material—such as described above—facing the pair of interdigitated drive and sense electrodes at this spacer element location on the substrate 110. The controller 190 can thus: read an electrical resistance (or a voltage representing electrical resistance) across a pair of sensor traces at a spacer element location; and transform this resistance into a force magnitude carried from the touch sensor surface 120, into the substrate 110, and into the adjacent the spacer element. In particular, the system 100 can include multiple spacer elements, and the controller 190 can: read electrical values from sensor traces at each spacer element location; convert these electrical values into force magnitudes carried by each spacer element; and aggregate these force magnitudes into a total force magnitude of an input on the touch sensor surface 120.

Therefore, in this configuration, the substrate 110 can define a unitary structure including a dense array of drive and sense electrode pairs 122 that form a touch sensor, a column of spiral traces that form a multi-layer inductor 115, and a sparse array of drive and sense electrode pairs 122 that form a set of capacitive force sensors 128 that support the substrate 110 on the chassis.

6.1.1 Capacitive Spacer Element

Alternatively, the bottom substrate layer 114 of the substrate 110 can include a sparse array of sensor traces (e.g., interdigitated drive and sense electrode pairs 122) arranged in a capacitive sensing configuration at each spacer element location such that each of these sensor traces capacitively couples: to the chassis; to the adjacent spacer element; to a spring element supporting the substrate 110 at this spacer element location; or to another fixed metallic element at this spacer element location. Accordingly, during a scan cycle, the controller 190 can: read capacitance values from the sensor traces at these spacer element locations; convert these capacitance values into force magnitudes carried by each spacer element during the scan cycle; and aggregate these force magnitudes into a total force magnitude of an input on the touch sensor surface 120.

Additionally or alternatively, the system 100 can include: a substrate 110 including a set of force sense electrodes arranged across a bottom surface of the substrate 110; and a baseplate 130 including a set of force drive electrodes configured to capacitively couple the set of force sense electrodes of the substrate 110 to form an array of capacitive force sensors below the substrate 110. The controller 190 can thus: read electrical values from the array of capacitive force sensors; interpret a force magnitude applied on the cover layer based on these electrical values; and trigger haptic feedback cycles in response to interpreting the force magnitude exceeding a target force magnitude.

6.1.2 Inductor Integration with Spacer Elements

Furthermore, in this configuration, the multi-layer inductor 115 can be integrated into a region of the substrate 110 offset from the spacer element locations (i.e., inset from regions of the substrate 110 occupied by sensor traces in these spacer element locations). For example, the array of spacer elements can be located proximal a perimeter of the substrate 110, and the spiral traces that form the multi-layer inductor 115 can be arranged near a lateral and longitudinal center of the substrate 110 in order to limit injection of electrical noise from the multi-layer inductor 115 into sensor traces in these spacer elements during a haptic feedback cycle.

6.2 Spring-Loaded Chassis Interface

Additionally, or alternatively as described in U.S. patent application Ser. No. 17/586,524, the system 100 can include a chassis interface: configured to mount to the chassis of the device; and defining a set of spring elements 132 coupled to the substrate 110 (e.g., via a set of spacer elements 140) and configured to deflect out of the plane of the chassis interface responsive to an input on the touch sensor surface 120 and/or responsive to actuation of the multi-layer inductor 115 during a haptic feedback cycle.

In this implementation, the chassis of the computing device can include a chassis receptacle defining a depth approximating (or slightly more than) the thickness of a set of spacer elements 140 (e.g., 1.2-millimeter chassis receptacle depth for 1.0-millimeter-thick spacer elements). The spacer elements are bonded to the chassis interface at each spring element. The chassis interface can then be rigidly mounted to the chassis over the receptacle, such as via a set of threaded fasteners or an adhesive. The substrate 110 and the set of spacer elements 140 may thus transfer a force-applied to the touch sensor surface 120-into these spring elements, which deflect inwardly below a plane of the chassis interface and into the chassis receptacle.

(In the configuration described above in which the substrate 110 includes sensors traces at these spacer element locations, each spacer is also compressed between the substrate 110 and the adjacent spring element when a force is applied to the touch sensor surface 120 and therefore exhibits a change in its local contact resistance across the adjacent sensor trace proportional to the force carried into the adjacent spring element. The controller 190 can therefore read electrical values (e.g., a resistances) across these sensor traces and convert these electrical values into portion of the input force carried by each sensor trace.)

6.3 Spring Elements and Chassis Interface

In similar variations, the system 100 includes a set of spacer elements 140, wherein each spacer element in the set is arranged over a discrete spacer element location—in a set of discrete spacer element locations—on a bottom surface (e.g., the bottom layer) of the substrate 110 below. The system 100 can further include an array of spring elements: that couple the set of spacer elements 140 to the chassis of the computing device; supporting the substrate 110 on the chassis; and configured to yield to oscillation of the substrate 110 (e.g., vertically or horizontally) responsive to an oscillating voltage driven across the multi-layer inductor 115 by the controller 190 during a haptic feedback cycle.

In one implementation, the system 100 includes a chassis interface defining a unitary metallic structure: arranged between the substrate 110 and the chassis; that defines an aperture below the multi-layer inductor 115; and that includes a set of flexures arranged about the aperture and defining the array of spring elements (e.g., flexure). In this implementation, the system 100 can also include a magnetic yoke arranged in the aperture of the unitary metallic structure; and the magnetic element 170 and the second magnetic element 170 can be arranged on the magnetic yoke below the multi-layer inductor 115. Accordingly, the magnetic yoke can limit a permeability path for magnetic field lines between the rear faces of the first and second magnetic elements 170 opposite the substrate 110.

In another implementation, the chassis interface and spring elements define a unitary structure (e.g., a "spring plate"). In one example, the chassis interface includes a thin-walled structure (e.g., a stainless steel 20-gage, or 0.8-millimeter-thick sheet) that is punched, etched, or laser-cut to form a flexure 134 aligned to each support location. Thus, in this example, each spring element can define a flexure 134—such as a multi-arm spiral flexure 134—configured to laterally and longitudinally locate the system 100 over the chassis and configured to deflect inwardly and outwardly from a nominal plane defined by the thin-walled structure.

More specifically, in this example, the chassis interface can include a unitary metallic sheet structure arranged between the substrate 110 and the chassis and defining a nominal plane. Each spring element: can be formed (e.g., fabricated) in the unitary metallic structure; can include a flexure 134 fabricated in the unitary metallic structure; and can be configured to return to approximately the nominal plane in response to absence of a touch input applied to the touch sensor surface 120. Additionally, the flexure 134 defines a stage 136 configured to couple the set of spacer elements 140 and support the set of spacer elements 140 to couple the substrate 110.

7. Controller

During operation, the controller 190 can: detect application of an input on the touch sensor surface 120 based on changes in electrical (e.g., capacitance or resistance, etc.) values between drive and sense electrode pairs 122 in the touch sensor integrated into the top layer(s) of the substrate 110; characterize a force magnitude of the input based on these electrical values read from the touch sensor and/or based on electrical values read from sensor traces in the spacer elements integrated into the bottom layer(s) of the substrate 110; and/or interpret the input as a "click" input if the force magnitude of the input exceeds a threshold force magnitude (e.g., 160 grams). Then, in response to detecting the input and/or interpreting the input as a "click" input, the controller 190 can execute a haptic feedback cycle, such as by transiently polarizing the multi-layer inductor 115 in order to induce alternating magnetic coupling between the multi-layer inductor 115 and the set of magnetic elements 170 and thus vibrating the substrate 110 within the chassis, serving haptic feedback to a user, and providing the user with tactile perception of downward travel of the touch sensor surface 120 analogous to depression of a mechanical momentary switch, button, or key.

8. Haptic Feedback Cycle

As described in U.S. patent application Ser. No. 17/855, 747, which is incorporated in its entirety by reference in this Application: the multi-layer inductor 115—integrated into the substrate 110—and the set of magnetic elements 170—housed within the chassis below the multi-layer inductor 115—cooperate to define a compact, integrated multi-layer inductor 115 configured to oscillate the substrate 110 and the touch sensor surface 120 responsive to polarization of the multi-layer inductor 115 by the controller 190 (e.g., in response detecting touch inputs on the touch sensor surface 120). More specifically, the controller 190, in conjunction with a drive circuit, can supply an alternating (i.e., time-varying) drive current to the multi-layer inductor 115 during a haptic feedback cycle, thereby generating a time-varying magnetic field through the multi-layer inductor 115 that periodically reverses direction. Thus, the controller 190 and/or the drive circuit can transiently polarize the multi-layer inductor 115 to generate magnetic forces between the multi-layer inductor 115 and the set of magnetic elements 170, thereby causing the multi-layer inductor 115 (and thus the substrate 110 and touch sensor surface 120) to be alternately attracted and repelled by poles of the set of magnetic elements 170 and oscillating the touch sensor surface 120 relative to the chassis.

In particular, in response to detecting a touch input—on the touch sensor surface 120—that exceeds a threshold force (or pressure) magnitude, the controller 190 drives the multi-layer inductor 115 during a "haptic feedback cycle" in order to tactilely mimic actuation of a mechanical snap button. For example, in response to such a touch input, the controller 190 can trigger a motor driver to drive the multi-layer inductor 115 with a square-wave alternating voltage for a target click duration (e.g., 250 milliseconds), thereby inducing an alternating magnetic field through the multi-layer inductor 115, which magnetically couples to the set of magnetic elements 170, induces an oscillating force between the magnetic element 170 and the multi-layer inductor 115, and oscillates the substrate 110 relative to the chassis of the device.

9. Inductive Force Sensing

Generally, as described in U.S. Non-Provisional application Ser. No. 17/946,931, the system 100 can: read electrical values (e.g., current directions and amplitudes; voltage polarities and amplitudes) from the multi-layer inductor 115; register a touch input at the cover layer responsive to changes in electrical values at the multi-layer inductor 115 (e.g., from baseline "null" current amplitudes); and drive an oscillating voltage across the multi-layer inductor 115 during a haptic feedback cycle responsive to registering the touch input at the cover layer.

9.1 Inductive Force Sensing

In one implementation, the system 100 can: interpret a force magnitude of a touch input applied on the cover layer based on electrical values read from the multi-layer inductor 115; and trigger oscillating voltage across the multi-layer inductor 115 based on interpreted force magnitudes applied on the cover layer.

In one example, the system 100 includes a controller 190 configured to: access the first set of electrical values, from the first multi-layer inductor 115, representing voltage across the first multi-layer inductor 115; detect the first change in electrical value including a first voltage of a first polarity across the first multi-layer inductor 115 at the first time; and register the first touch input on the cover layer in response to detecting the first voltage of the first polarity across the first inductor. The controller 190 can then: interpret a first force magnitude for the first touch input based on the first voltage of the first polarity; and trigger the oscillating voltage across the first multi-layer inductor 115 during the first haptic feedback cycle in response to the first force magnitude exceeding a target force magnitude.

Therefore, the system 100 can: regularly execute scan cycles for the multi-layer inductor 115 in order to interpret force magnitude applied on the cover layer; and conserve power by initializing the haptic feedback cycles responsive to exceeding a target force applied on the cover layer.

10. Spacer Materials and Structure

In one implementation, the system 100 includes a set of spacer elements 140 arranged below the substrate 110 and coupling the substrate 110 to a chassis. A spacer in the set of spacer elements 140 can be fabricated into a predetermined shape (e.g., rectangular structure) when arranged below the substrate 110. Additionally, the spacer can include an elastomer element 142 and an adhesive layer arranged on a first surface and/or a second surface of the elastomer. The elastomeric material for the elastomer element 142 can be selected from a set of materials with selective properties that are configured to transfer vibrations to the cover layer and dampen vibrations to the chassis.

10.1 Spacer Materials: Elastomer Material

In one implementation, the spacer includes an elastomer element 142 of an elastomeric material to effectively transmit vibrations to the touch sensor surface 120 and dampen vibrations to the chassis. In one example, the elastomer element 142 can be formed of a foam material or a combination of foam materials (e.g., charcoal foam, high density foam, lux foam). In another example, the elastomeric material for the elastomer element 142 can include: silicone, polyurethane, styrene butadiene, polyisoprene, polyisobutylene, and polychloroprene, or any combination, mixture, formula, or composite of these materials or subset of these materials.

Further in this implementation, the elastomer element 142 of the spacer includes physical properties of thickness, tensile strength, percent elongation, and compression set that each fall within a preferred range that is considered when selecting the elastomeric material. In one variation of the spacer, the thickness of the elastomer element 142 falls within a 0.25-millimeter—1.00-millimeter range. In another variation of the spacer, the tensile strength of the elastomer element 142 falls within a range of 150-psi-750-psi. In yet another variation of the spacer, the percent elongation of the elastomer element 142 falls within a range of 200%-800%. In yet another variation of the spacer, the compression set of the elastomer element 142 falls within a range of less than 25%.

In the present implementation, an elastomer element 142 with these materials and properties for the set of spacers in the system 100 optimally allow for: transmitting force on a touch sensor surface 120; haptics integration within the touch sensor to preserve vibrations transmitted to the touch sensor surface 120 and dampen vibrations to the chassis; and a natural feel of the touch sensor surface 120 when receiving an input from a user.

10.2 Spacer Materials: Adhesive Elements

In one implementation, the set of spacer elements 140 can include an adhesive layer of an adhesive material that cooperates with the elastomer element 142 to transmit and dampen vibrations. In this implementation, the adhesive material can include: silicone, acrylic, epoxy, cyanoacrylate, urethane, or any combination, mixture, formula, or composite of these materials or subset of these materials. Other variations of this implementation can also include liquid-type adhesives and heat activated film adhesives to bond to the elastomer.

In this implementation, the adhesive layer includes a thickness within a preferred range that is considered when arranging the set of spacer elements 140. The thickness of the adhesive layer can fall within a range of 10-micrometers—100 micrometers. Furthermore, the thickness for the adhesive layer can be derived from: physical properties of the adhesive layer (e.g., strength, ductility, wear resistance); height constraints of the system 100 (e.g., degrees of freedom of the spacer when arranged below the substrate 110 and coupled to the chassis); and sensor response recovery time. In one example, a thickness of 50 micrometers for the adhesive layer of a particular adhesive material results in a 1 second time delay for force sensor response. In another example, a thickness of 100-micrometers for the adhesive layer of the particular adhesive material results in a 16 second time delay for force sensor response. In yet another example, a thickness of 200 micrometers for the adhesive layer of the particular adhesive material results in a 60 second time delay for force sensor response. Additionally, in this implementation, changing the particular material and/or combining materials for the adhesive layer can result in variations of time delay for force sensor response.

Further in this implementation, a curing mechanism can be applied to the system 100 in order to bond the adhesive to the spacer. The curing mechanism applied can include pressure, moisture, heat, and irradiation or any combination thereof. The curing of the adhesive layer to the elastomer element 142 should result in the set of spacer elements 140 including a peel strength greater than 13-Newtons per square inch (preferably a peel strength of greater than 18-Newtons per square inch).

10.3 Spacer Materials: Carrier

In one implementation, the adhesive layer can include a carrier layer (e.g., a thin sheet) of a carrier material arranged between a first layer and a second layer of the adhesive layer. In this implementation, the carrier material for the carrier layer can include: polyethylene terephthalate (PET), polycarbonate, polyethylene, polypropylene, or any combination, mixture, formula, or composite of these materials or subset of these materials. In one variation of this implementation, the carrier layer can also be coated with a pressure-sensitive adhesive on both sides.

For example, a spacer in the set of spacer elements 140 can include: an elastomer element 142; an adhesive layer; and a carrier layer. The elastomer element 142 includes a top surface and a bottom surface. Additionally, the adhesive layer is arranged over each of the top surface and the bottom surface of the elastomer element 142 and includes a first layer and a second layer. Furthermore, the carrier layer is arranged between the first layer and the second layer of the adhesive layer.

In another implementation, the system 100 includes a first carrier layer 147: interposed between a first sub-adhesive layer 145 and a second sub-adhesive layer 146 of the first layer; and configured to support rigid formation of the first adhesive layer 144 coupling the substrate 110 to the elastomer element 142 formed of an elastomeric material (e.g., foam material). Additionally, the system 100 includes a second carrier layer 157: interposed between the third sub-adhesive layer 155 and the fourth sub-adhesive layer 156 of the second adhesive layer 154; and configured to support rigid formation of the second adhesive layer 154 coupling the elastomer element 142 to the baseplate 130.

In this implementation, the system 100 can implement different adhesive types for the first adhesive layer 144 coupled to the substrate 110 and the second adhesive layer 154 coupled to the baseplate 130. More specifically, the bottom substrate layer 114 of the substrate 110 can be formed of a fiberglass material that requires a stronger adhesive coupling than the baseplate 130 formed of a metal (e.g., stainless steel) material. Thus, the system 100 can include: the first adhesive layer 144 formed of a first adhesive type and coupled to the bottom substrate layer 114 of the substrate 110; and the second adhesive layer 154 formed of a second adhesive type, different and distinct from the first adhesive type, and coupled to the top surface of the baseplate 130.

For example, the system 100 can include the first adhesive layer 144 formed of a first adhesive type including: a first sub-adhesive layer 145; a second sub-adhesive layer 146; and a first carrier layer 147. The first sub-adhesive layer 145 is arranged across a top surface of the elastomer element 142. The second sub-adhesive layer 146 is: arranged over the first sub-adhesive layer 145; and coupled to the bottom substrate layer 114 of the substrate 110 at a support location, in the set of support locations. Additionally, the first carrier layer 147 is: interposed between the first sub-adhesive layer 145 and the second sub-adhesive layer 146; and configured to support the first adhesive layer 144 coupling the substrate 110 to the elastomer element 142.

In the aforementioned example, the system 100 further includes the second adhesive layer 154 formed of a second adhesive type, different and distinct from the first adhesive type and including: a third sub-adhesive layer 155; a fourth sub-adhesive layer 156; and a second carrier layer 157. The third sub-adhesive layer 155 is arranged across a bottom surface of the elastomer element 142 opposite the first sub-adhesive layer 145. The fourth sub-adhesive layer 156 is: arranged below the third sub-adhesive layer 155 opposite the second sub-adhesive layer 146; and coupled to a top surface of the baseplate 130 at a spring element, in the set of spring elements 132. The second carrier layer 157 is: interposed between the third sub-adhesive layer 155 and the fourth sub-adhesive layer 156; and configured to support the second adhesive layer 154 coupling the baseplate 130 to the elastomer element 142.

Furthermore, the carrier layer can be formed of a plastic layer (e.g., thermoplastic) configured to support rigid formation of the first adhesive layer 144 over the elastomer element 142 and the second adhesive layer 154 below the elastomer element 142. For example, the first carrier layer 147 can include: a first thermoplastic layer 148; a first pressure sensitive adhesive layer 149; and a second pressure sensitive adhesive layer 150. The first thermoplastic layer 148 defines a top surface and a bottom surface. The first pressure sensitive adhesive layer 149 is: arranged across the bottom surface of the first thermoplastic layer 148; and coupled to the first sub-adhesive layer 145 of the first adhesive layer 144. The second pressure sensitive adhesive layer 150 is: arranged across the top surface of the first thermoplastic layer 148; and coupled to the second sub-adhesive layer 146. Similarly, the second carrier layer 157 can include: a second thermoplastic layer 158; a third pressure sensitive adhesive layer 159; and a fourth pressure sensitive adhesive layer 160. The second thermoplastic layer 158 defines a top surface and a bottom surface. The third pressure sensitive adhesive layer 159: is arranged across the top surface of the second thermoplastic layer 158; and coupled to the third sub-adhesive layer 155 of the second adhesive layer 154. The fourth pressure sensitive adhesive layer 160 is: arranged across the bottom surface of the second thermoplastic layer 158; and coupled to the fourth sub-adhesive layer 156 of the second adhesive layer 154.

Therefore, the system 100 can include the adhesive layers including a carrier layer: to support rigid formation of the spacer element interposed between the substrate 110 and the baseplate 130; and increase bonding strength of the adhesive layers arranged above and below the elastomer element 142.

10.4 Spacer Structure: Adhesive Combinations

In one implementation, the spacer can include an elastomer element 142 with a first adhesive layer 144 of a first adhesive material type arranged on a first surface of the elastomer element 142 and a second adhesive layer 154 of a second adhesive type arranged on a second surface of the elastomer element 142. In this implementation, the first adhesive material type is different and distinct from the second adhesive material type. Each of the first adhesive material type and the second material type can be selected from the adhesive materials described above.

For example, a spacer in the set of spacer elements 140 can include: an elastomer element 142; a first adhesive layer 144; and a second adhesive layer 154. The elastomer element 142 can include a top surface and a bottom surface. Additionally, the first adhesive layer 144 is arranged over the top surface of the elastomer element 142 and includes a first adhesive material type. Furthermore, the second adhesive layer 154 is arranged below the bottom surface of the elastomer element 142 and includes a second adhesive material type. In this example, the first adhesive material type is distinct and different from the second adhesive material type.

In another implementation, the spacer includes an adhesive layer arranged on the top surface and the bottom surface of the elastomer element 142. In this implementation, the adhesive layer can include a combination of adhesive layers of particular adhesive material types.

For example, a spacer in the set of spacer elements 140 can include: an elastomer element 142; an adhesive layer; and a carrier. The elastomer element 142 includes a top surface and a bottom surface. Additionally, the adhesive layer includes: a first adhesive layer 144 of a first adhesive material type arranged over each of the top surface and the bottom surface; and a second adhesive layer 154 of a second adhesive material type arranged over the first adhesive layer 144 for the top surface and the bottom surface of the elastomer element 142. Furthermore, the carrier is arranged between the first adhesive layer 144 and the second adhesive layer 154. In this example, the first adhesive material type is distinct and different from the second adhesive material type.

In yet another implementation for adhesive combinations, the system 100 can include an elastomer element 142 with a first adhesive layer 144 arranged over a top surface and a second adhesive layer 154 arranged over a bottom surface. In this implementation, the first adhesive layer 144 can include a first adhesive type layer and a second adhesive type layer. Furthermore, the second adhesive layer 154 can include a third adhesive type layer and a fourth adhesive type layer. Furthermore, each of the first, second, third, and fourth adhesive type layers can include adhesive materials (i.e., the adhesive materials described above) that are distinct and different from each other.

In yet another example, the system 100 can include the sub-adhesive layers of the adhesive layers formed of different adhesive types. In this example, the system 100 can include the first adhesive layer 144 including: a first sub-adhesive layer 145; a second sub-adhesive layer 146; and a first carrier layer 147. The first sub-adhesive layer 145 is: formed of a first adhesive type; and arranged across a top surface of the plastic layer. Additionally, the second sub-adhesive layer 146: is formed of a second adhesive type, different from the first adhesive type; arranged over the first sub-adhesive layer 145; and coupled to the bottom substrate layer 114 of the substrate 110 at a support location, in the set of support locations. Additionally, the first carrier layer 147 is: interposed between the first sub-adhesive layer 145 and the second sub-adhesive layer 146; and configured to support the first adhesive layer 144 coupling the substrate 110 to the elastomer element 142.

Therefore, the system 100 can include adhesive layers including sub-adhesive layers formed of different adhesive types in order to increase bonding strength for the adhesive layers arranged above and below the elastomer element 142.

10.5 Spacer Materials: Thermoplastics

In one implementation, the set of spacer elements 140 can include an elastomer element 142 with a thermoplastic layer of a thermoplastic material arranged over a top surface and a bottom surface of the elastomer element 142. In this implementation, the thermoplastic layer can include a thermoplastic sheet of 25-micrometer-75-micrometer thickness. The thermoplastic material can include: polyethylene-terephthalate, polycarbonate, polyethylene, polypropylene, or any combination, mixture, formula, or composite of these materials or subset of these materials. Additionally, the thermoplastic layer can be arranged (e.g., bonded) over the elastomer element 142 by way of: adhesive and primer combination; physical treatment, chemical treatment, or any combination thereof.

In one example, a spacer in the set of spacer elements 140 includes: an elastomer element 142; a thermoplastic layer; a primer layer; and an adhesive layer. The elastomer element 142 includes a top surface and a bottom surface. Additionally, the thermoplastic layer is arranged over each of the top surface and the bottom surface for the elastomer element 142. The primer layer is arranged between the elastomer element 142 and the thermoplastic layer. Furthermore, the adhesive layer is arranged over each thermoplastic layer for the top surface and bottom surface of the elastomer element 142 and includes a first adhesive type.

In one variation of this implementation, the adhesive layer of the spacer in the set of spacer elements 140 can include a carrier as described above.

In yet another variation, the adhesive layer of the spacer element can implement combinations of adhesive layers of distinct and different adhesive types arranged over the elastomer element 142 as described above.

In another implementation, the system 100 can include the adhesive layers including a plastic layer (e.g., polyethylene-terephthalate, polycarbonate, polyethylene, polypropylene) in order to increase rigidity of the spacer element and support coupling of the substrate 110 to the baseplate 130. In this implementation, the plastic layer is arranged (e.g., bonded) across a top surface and a bottom surface of the elastomer element 142 formed of an elastomeric material (e.g., foam material).

For example, the system 100 can include the first adhesive layer 144 including: a first primer 151; a first plastic layer 152; and a first intermediate adhesive layer 153. The first primer 151 is applied over the elastomer element 142. The first intermediate adhesive layer 153 is applied across the top surface of the elastomer element 142 and arranged between the elastomer element 142 and the first primer 151. The first plastic layer 152 is: bonded to the first primer 151 and the first intermediate adhesive layer 153 applied across the top surface of the elastomer element 142; interposed between the top surface of the elastomer element 142 and the first sub-adhesive layer 145 of the first adhesive layer 144; and configured to rigidly support the first sub-adhesive layer 145, the second sub-adhesive layer 146, and the first carrier layer 147 over the elastomer element 142. Additionally, the system 100 includes the second adhesive layer 154 including: a second primer 161; a second plastic layer 162; and a second intermediate adhesive layer 163. The second primer 161 applied below the elastomer element 142. The second intermediate adhesive layer 163 is applied across the bottom surface of the elastomer element 142 and arranged between the elastomer element 142 and the second primer. Furthermore, the second plastic layer 162 is: bonded to the second primer 161 and the second intermediate adhesive layer 163 applied to the bottom surface of the elastomer layer; interposed between the bottom surface of the elastomer element 142 and the third sub-adhesive layer 155; and configured to rigidly support the third sub-adhesive layer 155, the fourth sub-adhesive layer 156, and the second carrier layer 157 below the elastomer element 142.

11. Spacer Integrations

In one implementation, the spacer materials and structure can be integrated into a human-computer interface system 100 including: a substrate 110; a cover layer; a magnetic element 170; a set of spacer elements 140; and a controller 190. The variations of materials and structures described above can be integrated into the set of spacer elements 140-coupling the substrate 110 to the chassis-arranged below the substrate 110 and configured to transfer vibrations resulting from vertical or horizontal oscillations from the haptic feedback system 100. Furthermore, the spacer materials and structure can be modified depending on the geometrical constraints of the spacer within the chassis such as: a set of spacer elements 140 arranged below the substrate 110 and constrained in the z-direction (e.g., height) when coupled to the chassis; and a set of spacer elements 140 arranged below the substrate 110 and coupled to a set of force sensor traces.

In another implementation, a spacer in the set of spacer elements 140 can include a predetermined shape (e.g., circle, square, or rectangular). Furthermore, the spacer in the set of spacer elements 140 can also include a complex or asymmetric shape. For example, the spacer in the set of spacer elements 140 can include a tapered design along the z-axis (e.g., a truncated cone).

11.1 Spacer Integrations: Height Constrained Spacer

In one implementation, as described above, the set of spacer elements 140 can be arranged underneath the substrate 110 and couple the substrate 110 to the chassis of a device. In this implementation, the set of spacer elements 140 are constrained in a z-direction (e.g., height) when coupled to the chassis. Furthermore, the set of spacer elements 140 for this implementation can include an elastomer element 142 and an adhesive layer configured to: transmit forces experienced on a touch sensor surface 120; and transmit vibrations to the touch sensor surface 120.

For example, the system 100 can include: a substrate 110; a chassis; and a set of spacer elements 140. The substrate 110 includes a set of drive and sense electrode pairs 122 arranged across a surface of the substrate 110. Additionally, the set of spacer elements 140: are arranged below the substrate 110; couple the substrate 110 to the chassis; and constrained by a predetermined height between the chassis and the substrate 110. Furthermore, in this example, a spacer in the set of spacer elements 140 can include: an elastomer element 142; an adhesive layer; and a carrier layer. The elastomer element 142 includes a top surface and a bottom surface. Additionally, the adhesive layer is arranged over each of the top surface and the bottom surface of the elastomer element 142 and includes a first layer and a second layer. Furthermore, the carrier layer is arranged between the first layer and the second layer of the adhesive layer.

11.2 Spacer Integrations: Spacer Elements

In one implementation, as described above, the system 100 can include a set of spacer elements 140 coupled directly to the force sensor traces arranged on a bottom end of the substrate 110. In this implementation, the set of spacer elements 140 can include combinations of an elastomer element 142 and an adhesive layer with a thermoplastic layer arranged between the elastomer element 142 and the adhesive layer.

For example, the system 100 can include: a chassis; a substrate 110; and a set of spacer elements 140. The substrate 110 includes a set of force sensor traces arranged on a bottom substrate layer 114 of the substrate 110. The set of spacer elements 140 are coupled to each of the set of force sensor traces and arranged between the substrate 110 and the chassis. Further in this example, a spacer in the set of spacer elements 140 can include: an elastomer element 142; a thermoplastic layer; a primer layer; and an adhesive layer. The elastomer element 142 includes a top surface and a bottom surface. Additionally, the thermoplastic layer is arranged over each of the top surface and the bottom surface for the elastomer element 142. The primer layer is arranged between the elastomer element 142 and the thermoplastic layer. Furthermore, the adhesive layer is arranged over each thermoplastic layer for the top surface and bottom surface of the elastomer element 142 and includes a first adhesive type.

11.3 Spacer Integrations: In-Mold Elastomer

In one implementation, the system 100 can include a set of spacer elements 140 arranged below the substrate 110 and coupled to a spring plate. A bottom surface of the elastomer element 142 for the set of spacer elements 140 is bonded directly (e.g., molded) to the spring surface to define discrete entities of elastomer elements 142 on each individual spring on the spring plate. For this implementation, the top surface of the elastomer element 142 can include combinations of primer layers, adhesive layers, and thermoplastic layers to bond the elastomer element 142 to the substrate 110.

For example, the system 100 can include: a chassis; a substrate 110; a spring plate and a set of spacer elements 140. The substrate 110 includes a set of force sensor traces arranged on a bottom substrate layer 114 of the substrate 110. The spring plate includes a set of spring elements 132 and is arranged below the substrate 110. The set of spacer elements 140 are coupled to each of the set of force sensor traces and arranged between the substrate 110 and the spring plate.

Further in this example, a spacer in the set of spacer elements 140 can include: an elastomer element 142; a thermoplastic layer; a primer layer; a first adhesive layer 144; and a second adhesive layer 154. The elastomer element 142 includes a top surface and a bottom surface. The bottom surface of the elastomer element 142 is directly bonded to a spring element in the set of spring elements 132 to define discrete entities of elastomer elements 142 for spring elements in the set of spring elements 132. The primer layer is arranged over the top surface of the elastomer element 142. The first adhesive layer 144 of a first adhesive type is arranged over the primer layer. The thermoplastic layer is arranged over the first adhesive layer 144. The second adhesive layer 154 of a second adhesive type is arranged over the thermoplastic layer.

11.4 Spacer Integrations: Touch Triggered Haptic Feedback

In one implementation, the system 100 can: interpret touch inputs applied over the substrate 110; and, in response to interpreting touch inputs over the substrate 110, trigger a haptic feedback cycle to oscillate the substrate 110. In this implementation, the system 100 includes: a multi-layer inductor 115 integrated within the substrate 110; and a magnetic element 170 arranged below the multi-layer inductor 115 and configured to magnetically couple the multi-layer inductor 115. Thus, the set of spacer elements 140 interposed between the substrate 110 and the baseplate 130 are configured to transfer oscillations—generated by magnetic coupling between the multi-layer inductor 115 and the magnetic element 170—to the substrate 110.

In one example, the system 100 includes the substrate 110 including: a set of drive and sense electrode pairs 122 arranged across the top substrate layer 112 of the substrate 110; and a multi-layer inductor 115 arranged below the top substrate layer 112 of the substrate 110. Additionally, the system 100 includes a magnetic element 170: arranged below the substrate 110; defining a first polarity facing the multi-layer inductor 115; and configured to inductively couple the multi-layer inductor 115 responsive to forces applied on the touch sensor surface 120. In this example, the system 100 includes a controller 190 configured to: read a first set of electrical values from the set of drive and sense electrode pairs 122; detect a touch input at a first location on the touch sensor surface 120 based on the first set of electrical values (e.g., deviations from baseline electrical values); and, in response to detecting the touch input, trigger a first oscillating voltage across the multi-layer inductor 115 during a haptic feedback cycle to induce alternating magnetic coupling between the multi-layer inductor 115 and the magnetic element 170.

11.5 Spacer Integrations: Inductive Force Sensing

In one implementation, the system 100 can: interpret force magnitudes for touch inputs applied over the substrate 110 based on changes in electrical values across the multi-layer inductor 115; and, in response to the force magnitude applied to the substrate 110 exceeding a threshold force magnitude, trigger a haptic feedback cycle to oscillate the substrate 110. In this implementation, the system 100 can include: a multi-layer inductor 115 integrated within the substrate 110; and a magnetic element 170 arranged below the multi-layer inductor 115 and configured to magnetically couple the multi-layer inductor 115.

In this implementation, the system 100 can receive application of a force applied over the substrate 110 that then results in compression of the set of spacer elements 140 interposed between the substrate 110 and the set of spring elements 132. Additionally, the set of spring elements 132 then compress from their nominal plane, thereby urging the substrate 110—and therefore the multi-layer inductor 115— to move toward the magnetic element 170. The change in displacement between the multi-layer inductor 115 and the magnetic element 170 results in a change in electrical values across the multi-layer inductor 115. The system 100 can then: detect this change in electrical values; and interpret a force magnitude applied over the substrate 110 based on this change in electrical values.

In one example, the system 100 further includes a set of inductor layers including: a first inductor layer 116; a second inductor layer 118; and a magnetic element 170. The first inductor layer 116 includes a first spiral trace 117: coiled in a first direction across the first inductor layer 116; and defining a first end and a second end. The second inductor layer 118 is arranged below the first inductor layer 116 and includes a second spiral trace 119: coiled in a second direction, opposite the first direction, across the second inductor layer 118; defining a third end and a fourth end, the third end electrically coupled to the second end of the first spiral trace 117; and cooperating with the first spiral trace 117 to form a multi-layer inductor 115. Furthermore, the system 100 includes a magnetic element 170: arranged below the substrate 110; defining a first polarity facing the multi-layer inductor 115; and configured to inductively couple the multi-layer inductor 115 responsive to forces applied on the touch sensor surface 120.

In the aforementioned example, the system 100 can further include a controller 190 configured to: read a first set of electrical values from the multi-layer inductor 115; detect a first change in electrical values at the multi-layer inductor 115 based on the first set of electrical values; interpret a force magnitude for a touch input applied on the touch sensor surface 120 based on the first change in electrical values; and, in response to the force magnitude exceeding a threshold force magnitude, trigger a first oscillating voltage across the multi-layer inductor 115 during a haptic feedback cycle to induce alternating magnetic coupling between the multi-layer inductor 115 and the magnetic element 170.

11.6 Spacer Integrations: Thru-Mode Capacitive Force Sensing

In another implementation, the system 100 can: interpret force magnitudes for touch inputs applied over the substrate 110 based on changes in electrical values across a second set of sense electrodes 124 arranged across the bottom substrate layer 114 of the substrate 110; and, in response to the force magnitude applied to the substrate 110 exceeding a threshold force magnitude, trigger a haptic feedback cycle to oscillate the substrate 110. In this implementation, the system 100 includes: the substrate 110 including the second set of sense electrodes 124 arranged across the bottom substrate layer 114 of the substrate 110; and a second set of drive electrodes 126 arranged across the baseplate 130 cooperating with the second set of sense electrodes 124 to form a capacitive force sensor.

In this implementation, the system 100 can receive application of a force applied over the substrate 110 that then results in compression of the set of spacer elements 140 interposed between the substrate 110 and the set of spring elements 132. Additionally, the set of spring elements 132 then compress from their nominal plane, thereby urging the substrate 110—and therefore the second set of sense electrodes 124—to move toward the baseplate 130. The change in displacement between the second set of sense electrodes 124 and the second set of drive electrodes 126 results in a change in electrical values across the capacitive force sensor. The system 100 can then: detect this change in electrical values; and interpret a force magnitude applied over the substrate 110 based on this change in electrical values.

In one example, the system 100 includes the substrate 110 including: a multi-layer inductor 115 arranged below the top substrate layer 112 of the substrate 110; and a second set of sense electrodes 124 arranged across the bottom substrate layer 114 proximal the set of support locations. Additionally, the system 100 includes the baseplate 130 including a second set of drive electrodes 126: arranged across a top surface of the baseplate 130 proximal the set of spring elements 132; arranged in alignment with the second set of sense electrodes 124 at the bottom substrate layer 114 of the substrate 110; and configured to capacitively couple the second set of sense electrodes 124 to form a set of capacitive force sensors 128 and effect capacitance values of the second set of sense electrodes 124 responsive to displacement of the substrate 110 toward the baseplate 130. Additionally, the system 100 can further include a magnetic element 170: arranged below the substrate 110; defining a first polarity facing the multi-layer inductor 115; and configured to inductively couple the multi-layer inductor 115 responsive to forces applied on the touch sensor surface 120.

In the aforementioned example, the system 100 further includes a controller 190 configured to read a first set of electrical values from the multi-layer inductor 115. Furthermore, in response to detecting a first change in electrical values at the multi-layer inductor 115 based on the first set of electrical values, the controller 190 can: interpret presence of a first touch input applied to the touch sensor surface 120 based on the first change in electrical values; read a second set of electrical values from the set of capacitive force sensors 128; interpret a first force magnitude for the first touch input based on the second set of electrical values; and, in response to the first force magnitude exceeding a threshold force magnitude, trigger a first oscillating voltage across the multi-layer inductor 115 during a haptic feedback cycle to induce alternating magnetic coupling between the multi-layer inductor 115 and the magnetic element 170.

11.7 Spacer Integration: Output Touch Location and Force Magnitude

In one implementation, the system 100 can: interpret touch inputs applied over the substrate 110 based on changes in electrical values across a first set of drive and sense electrode pairs 122 across a top substrate layer 112 of the substrate 110; interpret force magnitudes for these touch inputs applied over the substrate 110 based on changes in electrical values across a second set of sense electrodes 124 arranged across the bottom substrate layer 114 of the substrate 110; and output touch image containing the location and the force magnitude of the touch inputs applied over the substrate 110. In this implementation as described above, the system 100 includes: the substrate 110 including the second set of sense electrodes 124 arranged across the bottom substrate layer 114 of the substrate 110; and a second set of drive electrodes 126 arranged across the baseplate 130 cooperating with the second set of sense electrodes 124 to form a capacitive force sensor.

For example, the system 100 includes the substrate 110 including: a first set of drive and sense electrode pairs 122 arranged across the top substrate layer 112 of the substrate 110; and a second set of sense electrodes 124 arranged across the bottom substrate layer 114 proximal the set of support locations. Furthermore, the system 100 includes the baseplate 130 including a second set of drive electrodes 126: arranged across a top surface of the baseplate 130 proximal the set of spring elements 132; arranged in alignment with the second set of sense electrodes 124 at the bottom substrate layer 114 of the substrate 110; and configured to capacitively couple the second set of sense electrodes 124 to form a set of capacitive force sensors 128 and effect capacitance values of the second set of sense electrodes 124 responsive to displacement of the substrate 110 toward the baseplate 130.

In the aforementioned example, the system 100 can further include a controller 190 configured to: read a first set of electrical values from the first set of drive and sense electrode pairs 122; read a second set of electrical values from the set of capacitive force sensors 128; detect a lateral position and a longitudinal position of a touch input applied to the touch sensor surface 120 based on the first set of electrical values; interpret a first force magnitude of the touch input based on the second set of electrical values; and output a touch image containing the lateral position, the longitudinal position, and the force magnitude.

12. Device Variations

In one implementation, the system 100 can be integrated as a peripheral trackpad and/or keyboard device—in order to enable real-time force sensing and haptic feedback capabilities on these portable electronic devices. Additionally, the system 100 can be integrated into the chassis of a computing device, such as a laptop computer, to form a force sensitive trackpad or keyboard surface configured to serve real-time haptic feedback to a user interfacing with the computing device and to detect positions and/or forces of the inputs applied over the trackpad or keyboard surface. Other integrations of the system 100 can include a portable electronic device such as under the display of a smartphone or smartwatch.

12.1 Device Variations: Peripheral Device

In one implementation, as described above, the system 100 can be integrated as a peripheral trackpad and/or keyboard device—in order to enable real time force sensing and haptic feedback capabilities on these portable electronic devices. In this implementation, it is desirable to reduce the amount a trackpad can be pushed laterally by a user. As a result, the peripheral trackpad device can include soft spacer elements on the edges of the trackpad and stiff spacer elements for the corners of the device to reduce the amount the trackpad can be pushed laterally.

For example, the trackpad can include: a set of corner spacer elements arranged on corners of the trackpad; and a set of edge spacer elements arranged along edges of the track pad. In one variation of this example, the set of edge spacers are arranged in an evenly spaced configuration. In this example, the set of corner spacer elements include a stiffness coefficient of $k_1$ and the set of edge spacer elements include a stiffness coefficient of $k_2$ such that $k_1 > k_2$. The corner spacer elements and the edge spacer elements include materials and structures described above.

12.2 Device Variations: Computing Device

In one implementation, as described above, the system 100 can be integrated into the chassis of a computing device, such as a laptop computer, to form a force sensitive trackpad or keyboard surface configured to serve real-time haptic feedback to a user. In this implementation, sets of spacer elements of varying thickness are integrated with the trackpad sensor subassembly for the device. Additionally, the sets of spacer elements can be positioned in a non-parallel configuration with respect to the touch sensor surface 120. Furthermore, variations of spacer material and structures described above can be integrated based on the location of the sets of spacer elements relative to the local geometry of the chassis.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for a touch sensor comprising:
   a substrate;
   a baseplate arranged under the substrate;
   a first spring element:
      arranged about the baseplate; and
      configured to yield to displacement of the substrate toward the baseplate responsive to forces applied over the substrate;
   a first spacer element:
      interposed between a bottom layer of the substrate and the first spring element;
      comprising:
         an elastomer element;
         a top layer:
            arranged over the elastomer element; and
            coupled to the bottom layer of the substrate; and
         a bottom layer:
            arranged below the elastomer element; and
            coupled to the baseplate; and
      configured to compress responsive to forces applied over the substrate.

2. The system of claim 1:
   wherein the top layer comprises a top set of sub-adhesive layers interposed between a top surface of the elastomer element and the bottom layer of the substrate; and
   wherein the bottom layer comprises a bottom set of sub-adhesive layers interposed between a bottom surface of the elastomer element and the baseplate.

3. The system of claim 2:
   wherein the top set of sub-adhesive layers are formed of a first adhesive type; and
   wherein the bottom set of sub-adhesive layers are formed of a second adhesive type, different from the first adhesive type.

4. The system of claim 2:
   wherein the top layer further comprises a top intermediate layer:
      interposed within the top set of sub-adhesive layers; and
      configured to support coupling of the elastomer element to the bottom layer of the substrate,
   wherein the bottom layer further comprises a bottom intermediate layer:
      interposed within the bottom set of sub-adhesive layers; and
      configured to support coupling of the elastomer element to the baseplate.

5. The system of claim 1, wherein the top layer comprises:
   a first sub-adhesive layer arranged across a top surface of the elastomer element;
   a second sub-adhesive layer:
      arranged over the first sub-adhesive layer; and
      coupled to the bottom layer of the substrate; and
   a first intermediate layer:
      interposed between the first sub-adhesive layer and the second sub-adhesive layer; and
      configured to support adhesion of the of the elastomer element to the bottom layer of the substrate.

6. The system of claim 5, wherein the first carrier layer comprises:
   a first thermoplastic layer;
   a first pressure sensitive adhesive layer:
      arranged across a bottom surface of the first thermoplastic layer; and
      coupled to the first sub-adhesive layer; and
   a second pressure sensitive adhesive layer:
      arranged across a top surface of the thermoplastic layer; and
      coupled to the second sub-adhesive layer.

7. The system of claim 5:
   wherein the first sub-adhesive layer is formed of a first adhesive type; and
   wherein the second sub-adhesive layer is formed of a second adhesive type, different from the first adhesive type.

8. The system of claim 1:
   wherein the elastomer element:
      is formed of a silicone material;
      defines a first height; and
   wherein the top layer:
      defines a second height, less than the first height, of the elastomer element; and
      comprises:
         a primer across a top surface of the elastomer element;
         a first plastic layer arranged over the elastomer element and bonded to the primer across the top surface of the elastomer; and
         a first intermediate adhesive layer interposed between the elastomer element and the first plastic layer.

9. The system of claim 1:
   wherein the substrate comprises:
      a set of drive and sense electrode pairs arranged across a top layer of the substrate; and a multi-layer inductor arranged across a set of inner layers, below the top layer, of the substrate;
further comprising a first magnetic element:
   arranged below the substrate;
   defining a first polarity facing the multi-layer inductor; and
   configured to inductively couple the multi-layer inductor responsive to forces applied over the substrate; and
further comprising a controller configured to:
   read a first set of electrical values from the set of drive and sense electrode pairs;
   detect a touch input at a first location on over the substrate based on the first set of electrical values; and
   in response to detecting the touch input, trigger a first oscillating voltage across the multi-layer inductor during a haptic feedback cycle to induce alternating magnetic coupling between the multi-layer inductor and the first magnetic element.

10. The system of claim 1:
wherein the substrate further comprises:
   a multi-layer inductor arranged within a set of inner layers of the substrate; and
   a first sense electrode arranged on the bottom layer of the substrate proximal the first spacer element;
wherein the baseplate comprises a first drive electrode:
   arranged on the baseplate proximal the first spring element;
   arranged in alignment with the first sense electrode on the bottom layer of the substrate; and
   configured to capacitively couple the first sense electrode to form a capacitive force sensor and effect capacitance values of the sense electrode responsive to displacement of the substrate toward the baseplate; and
further comprising a first magnetic element:
   arranged below the substrate;
   defining a first polarity facing the multi-layer inductor; and
   configured to inductively couple the multi-layer inductor responsive to forcer applied over the substrate.

11. The system of claim 10, further comprising a controller configured to:
   read a first set of electrical values from the multi-layer inductor; and
   in response to detecting a first change in electrical values at the multi-layer inductor based on the first set of electrical values:
      detect presence of a first touch input applied over the substrate based on the first change in the electrical values;
      read a second set of electrical values from the capacitive force sensors;
      interpret a first force magnitude for the first touch input based on the second set of electrical values; and
      in response to the first force magnitude exceeding a threshold force magnitude, trigger a first oscillating voltage across the multi-layer inductor during a haptic feedback cycle to induce alternating magnetic coupling the between the multi-layer inductor and the first magnetic element.

12. The system of claim 1:
wherein the baseplate and the spring element form a unitary structure:
   defining a nominal plane arranged below the substrate; and
   locating the spring element about a periphery of the unitary structure;
wherein the spring element comprises a flexure:
   formed in the unitary structure;
   defining a stage; and
   configured to return to approximately the nominal plane in response to absence of a touch input applied over the substrate; and
wherein the spacer element couples a first support location on the bottom layer of the substrate to the stage of the spring element.

13. The system of claim 1:
wherein the substrate further comprises a set of inductor layers comprising:
   a first inductor layer comprising a first spiral trace coiled in a first direction; and
   a second inductor layer arranged below the first inductor layer and comprising a second spiral trace:
      coiled in a second direction, opposite the first direction; and;
      cooperating with the first spiral trace to form a multi-layer inductor; and
further comprising a first magnetic element:
   arranged below the substrate;
   defining a first polarity facing the multi-layer inductor; and
   configured to inductively couple the multi-layer inductor responsive to forces applied over the substrate.

14. The system of claim 13, further comprising a controller configured to:
   read a first set of electrical values from the multi-layer inductor;
   detect a first change in electrical values at the multi-layer inductor based on the first set of electrical values;
   interpret a force magnitude for a touch input applied over the substrate based on the first change in electrical values; and
   in response to the force magnitude exceeding a threshold force magnitude, trigger a first oscillating voltage across the multi-layer inductor during a haptic feedback cycle to induce alternating magnetic coupling between the multi-layer inductor and the first magnetic element.

15. A spacer element comprising:
an elastomer element defining a first height;
a top layer:
   defining a second height less than the first height of the elastomer element;
   comprising:
      a first set of adhesive layers arranged over the elastomer element; and
      a first intermediate layer interposed within the first set of adhesive layers and configured to support formation of the first set of adhesive layers over the elastomer element; and
a bottom layer:
   defining a third height approximating the second height of the first set of layers and less than the first height of the elastomer element; and
   comprising:
      a second set of adhesive layers arranged below the elastomer element; and
      a second intermediate layer interposed within the second set of adhesive elements and configured to support formation of the second set of adhesive layers below the elastomer element.

16. The spacer element of claim 15:
wherein the first set of adhesive layers comprises:
- a first adhesive layer arranged across the top surface of the elastomer element; and
- a second adhesive layer arranged over the first adhesive layer; and wherein the first intermediate layer comprises:
- a set of pressure sensitive layers interposed within the first adhesive layer and the second adhesive layer; and
- a thermoplastic layer interposed within the set of pressure sensitive layers.

17. The spacer element of claim 15, wherein the top layer further comprises:
- a first primer arranged across a top surface of the elastomer element;
- a first plastic layer:
  - bonded to the first primer across the top surface of the elastomer element;
  - interposed between the top surface of the elastomer element and a bottom adhesive layer, in the first set of adhesive layers; and
  - configured to rigidly support the first set of adhesive layers and the intermediate layer over the elastomer element.

18. A spacer element comprising:
an elastomer element defining a first height;
a top set of adhesive layers arranged over the elastomer element; and
a first intermediate layer interposed within the first set of adhesive layers and configured to support formation of the first set of adhesive layers over the elastomer element;
a bottom set of adhesive layers arranged below the elastomer element; and
a second intermediate layer interposed within the second set of adhesive elements and configured to support formation of the second set of adhesive layers below the elastomer element.

19. The spacer element of claim 18, further comprising:
a first primer arranged across a top surface of the elastomer element;
a first plastic layer:
- bonded to the first primer across the top surface of the elastomer element;
- interposed between the top surface of the elastomer element and a bottom adhesive layer, in the first set of adhesive layers; and
- configured to rigidly support the first set of adhesive layers and the intermediate layer over the elastomer element.

20. The spacer element of claim 18, wherein the first intermediate layer comprises:
a set of pressure sensitive layers interposed within the top set of adhesive layers; and
a thermoplastic layer interposed within the set of pressure sensitive layers.

* * * * *